United States Patent [19]
Suzuki et al.

[11] Patent Number: 5,864,358
[45] Date of Patent: Jan. 26, 1999

[54] METHOD FOR SWITCHING PROGRAMS IN DIGITAL BROADCASTING AND DIGITAL BROADCAST RECEIVING APPARATUS

[75] Inventors: Hidekazu Suzuki, Yamatokoriyama; Toshirou Nishio, Hirakata; Souichirou Katsuki, Katano; Masashi Kubota, Kobe, all of Japan

[73] Assignee: Matsushita Electric Industrial Co., Ltd., Kadoma, Japan

[21] Appl. No.: 667,654

[22] Filed: Jun. 21, 1996

[30] Foreign Application Priority Data

Jun. 26, 1995 [JP] Japan .................................... 7-159111
Nov. 1, 1995 [JP] Japan .................................... 7-284767

[51] Int. Cl.$^6$ ....................................................... H04N 7/10
[52] U.S. Cl. .............................. 348/10; 370/486; 455/6.2; 348/11
[58] Field of Search ................................... 348/10–11, 7, 348/12, 13, 705; 370/486; 455/4.1, 6.1, 6.2

[56] References Cited

U.S. PATENT DOCUMENTS

| | | | |
|---|---|---|---|
| 5,115,426 | 5/1992 | Spanke | 348/705 |
| 5,418,782 | 5/1995 | Wasilewski | 370/486 |
| 5,450,139 | 9/1995 | Haraguchi et al. | 348/705 |
| 5,469,431 | 11/1995 | Wendorf et al. | 455/4.1 |
| 5,526,427 | 6/1996 | Thomas et al. | 348/1 |
| 5,550,577 | 8/1996 | Verbiert et al. | 348/10 |
| 5,550,578 | 8/1996 | Hoarty et al. | 370/486 |
| 5,586,121 | 12/1996 | Moura et al. | 370/486 |
| 5,587,734 | 12/1996 | Lauder et al. | 348/10 |
| 5,612,729 | 3/1997 | Ellis et al. | 348/2 |
| 5,627,836 | 5/1997 | Conoscent et al. | 370/486 |

FOREIGN PATENT DOCUMENTS 775089  3/1995  Japan .

*Primary Examiner*—Victor R. Kostak
*Attorney, Agent, or Firm*—Renner, Otto, Boisselle & Sklar, P.L.L.

[57] ABSTRACT

According to the present invention, a method for switching programs in a digital broadcasting is provided. In this method, on a transmission side, a physical channel number for transmitting a program having a program number therethrough is assigned to a part of the program number. On a receiving side, in changing program numbers from a first program number to a second program number, a second physical channel number, for transmitting a second program having the second program number therethrough, is identified based on the second program number; wherein it is determined whether or not the identified second physical channel number is the same as a first physical channel number which is now being received; and wherein if it is determined that the first and the second physical channel numbers are not the same, switching is performed for receiving the physical channel having the identified second physical channel number.

18 Claims, 17 Drawing Sheets

TS_ID: Transport stream ID
EL_PID: Elementary PID

TS_ID: Transport stream ID
EL_PID: Elementary PID

TS_ID: Transport stream ID
EL_PID: Elementary PID

EL_PID: Elementary PID

METHOD FOR SWITCHING PROGRAMS IN DIGITAL BROADCASTING AND DIGITAL BROADCAST RECEIVING APPARATUS

BACKGROUND OF THE INVENTION

1. Field of the Invention

The present invention relates to a digital broadcast receiving apparatus and a method for switching programs in digital broadcasting.

2. Description of the Related Art

In recent years, various activities for standardizing digital broadcasting are being vigorously carried on in many countries. Broadcasting systems called "ATV" (advanced television) and DVB (digital video broadcasting) have seen suggested in the Unites States and in Europe, respectively, and are under research and development for being put into practical use within a couple of years. In Japan, the activities for standardizing digital satellite broadcasting using a communication satellite have also been proceeding. All of these broadcasting systems are being developed based on the MPEG2 standard, which became an international standard in November 1994.

In digital broadcasting, the number of channels is greatly increased as compared with that of current broadcasting. However, the larger the number of channels becomes, the more sophisticated the procedure for selecting a channel or a program is required to be. More specifically, since transport streams corresponding to multiple programs include a large number of individual video and audio streams to be transmitted, information indicating which program should be selected from a plurality of programs or information indicating which packets should be retrieved from the large number of streams is required. Thus, in the MPEG2 standard, various kinds of transmission control information required for receiving a desired program is supposed to be transmitted in the form of a plurality of additional information tables called "PSI (program specific information)" tables. There are the following three kids of PSI tables complying with the MPEG2 standard: a PAT (program association table); a PMT (program map table); and a CAT (conditional access table).

A PAT is a table showing a relationship between a program_number and a packet ID (PID) specifying a PMT (such a PID is called a "PMT_PID"). A PMT is a table showing a relationship between a program_number and the PIDs of the elements, such as video elements, audio elements and clock references, composing the program (such PIDs are called "elementary PIDs"). In this case, a PID is a number for identifying a packet and is also called a "packet identifier". The PIDs assigned to video packets and audio packets are called "elementary PIDs".

In this way, the necessary information is indirectly described while distributing the information between a PAT and a PMT. This is because if all the information is described in only one table, the size of the table becomes too large so that the capacity of the memory for storing such a large table therein is also disadvantageously increased and it takes a lot of time to access the desired information.

A CAT is used in a chargeable broadcasting system or the like, and is an additional table used by a permitted user for decoding and reproducing scrambled streams or a table showing a relationship between the PIDs and EMM (entitled management message) streams.

Furthermore, though it is not defined in the MPEG2 standard, an NIT (network information table) is defined as a table required for receiving programs in the DVB standard in Europe. The names of networks and various transmission parameters are included in an NIT. An NIT is a table showing a relationship between a program number and transport stream IDs individually corresponding to a plurality of physical channels and like relationships. Based on this table, it is possible to know a correspondence between a program number and the physical channel number through which the program is transmitted (or a transport stream ID).

On the other hand, according to the MPEG2 standard, data, the contents of which are not defined and are to be defined by a user himself, is called "private data". Private data of a section type is specifically called a "private section".

It is noted that there is a detailed description of the terms cited above in ISO/IEC 13818-1, November 1994.

Next, the processing flow executed in a receiving apparatus (currently under development) for changing program numbers will be described with reference to FIG. 17. Note that FIG. 17 shows a case where the propagation path is a satellite.

Assume that a program_number=x is now being received and that signals, transmitted from a transponder (or a radio wave repeater) having a transponder number n0 selected from a plurality of transponders provided for a satellite, are now being received (Step n1). During the receiving, various tables including the above-described NITs, PATs and PMTs are received and then stored into a memory.

In this case, it should be noted that a "program number" complying with the MPEG2 standard corresponds to a channel number in conventional analog broadcasting and does not correspond to an individual program such as a news telecast, a sport on-the-spot telecast and the like.

Next, if a viewer changes the program number to select a program_number=y (at Step n2), a search is performed to determine whether or not the program_number=y is included in the PAT of the transponder n0 which is now used for receiving, or whether or not a program having the program_number=y is transmitted from the transponder n0 (at Step n3). In satellite delivering, the number of a transponder individually corresponds to a transport stream ID.

In the case where the program_number=y is included in the PAT of the transponder n0, a packet ID of a PMT (or a PMT_PID) corresponding to the program_number=y is found (at Step n4); elementary PIDs (EL_PIDS) corresponding to the program_number=y are found on the PMT having the PID (at Step n5); and then video packets, audio packets and program clock references (PCRs) having the EL_PIDs are extracted, thereby performing video decoding and audio decoding and reproducing the clocks (at Step n6).

On the other hand, in the case where the program_number=y is not included in the PAT of the transponder n0 which is now used for receiving, it is searched for on an NIT with which transponder number (or transport stream ID) the program_number=y is transmitted. Assuming that the program_number=y is transmitted from a transponder having a transponder number n (at Step n7), the receiving frequency is switched to the frequency of the transponder n for receiving PATs, PMTs and the like (at Step n8) so as to return to Step n4. That is to say, a packet ID of a PMT (or a PMT_PID) corresponding to the program_number=y is found on the PAT of the transponder n (at Step n4); elementary PIDs (EL_PIDs) corresponding to the program_number=y are found on the PMT having the PID (at Step n5); and then video packets, audio packets and program clock references (PCRs) having the EL_PIDs are extracted, thereby performing video decoding and audio decoding and reproducing the clocks (at Step n6).

The processing flow currently under development for changing program numbers is generally executed in such a manner as described above.

However, in such a conventional method for changing program numbers, the time required for obtaining a packet ID of a PMT (a PMT_PID) greatly differs depending upon whether or not the program number to be selected is included in the PAT before the switching or whether or not the above-described process steps n7 and n8 are required to be performed. Accordingly, such a method adversely gives some restlessness to a viewer.

SUMMARY OF THE INVENTION

According to the present invention, a method for switching programs in a digital broadcasting is provided. In this method, on a transmission side, a physical channel number for transmitting a program having a program number therethrough is assigned to a part of the program number and on a receiving side, in changing program numbers from a first program number to a second program number, a second physical channel number, for transmitting a second program having the second program number therethrough, is identified based on the second program number. It is determined whether or not the identified second physical channel number is the same as a first physical channel number which is now being received; and if it is determined that the first and the second physical channel numbers are not the same, switching is performed for receiving the physical channel having the identified second physical channel number.

In one embodiment, on a transmission side, a physical channel number for transmitting a program having a program number therethrough is assigned to a part of the program number, and on a receiving side, in changing program numbers from a first program number to a second program number, the method includes the steps of: identifying a second physical channel number based on the second program number, for transmitting a second program having the second program number therethrough; determining whether or not the identified second physical channel number is the same as a first physical channel number which is now being received; switching so as to receive the physical channel having the identified second physical channel number, if it is determined that the first and the second physical channel numbers are not the same; extracting a program map table packet identifier corresponding to the second program number from a program association table including the second program number; extracting an elementary packet identifier corresponding to the second program number from a program map table including the extracted program map table packet identifier; and extracting a packet having the extracted elementary packet identifier from a transport stream.

In another embodiment, on a transmission side, a physical channel number for transmitting a program having a program number therethrough is assigned to a part of the program number and program association tables of all physical channels are transmitted as private data to transport streams of all of the physical channels, and on a receiving side, in changing program numbers from a first program number to a second program number, the method includes the steps of: identifying a second physical channel number based on the second program number, for transmitting a second program having the second program number therethrough; determining whether or not the identified second physical channel number is the same as a first physical channel number which is now being received; extracting a program map table packet identifier, corresponding to the second program number, from a program association table including the second program number, if it is determined that the first and the second physical channel numbers are the same; switching so as to receive the physical channel having the identified second physical number and simultaneously extracting a program map table packet identifier, corresponding to the second program number, from one of the program association tables which have been transmitted as private data, if it is determined that the first and the second physical channel numbers are not the same; extracting an elementary packet identifier, corresponding to the second program number, from a program map table including the extracted program map table packet identifier; and extracting a packet having the extracted elementary packet identifier from a transport stream.

In still another embodiment, on a transmission side, a physical channel number for transmitting a program having a program number therethrough is assigned to a part of the program number and program association tables of all physical channels are transmitted as private data to transport streams of all of the physical channels, and on a receiving side, in changing program numbers from a first program number to a second program number, the method includes the steps of: (a) identifying a second physical channel number based on the second program number for transmitting a second program having the second program number therethrough based on the second program number; (b) determining whether or not the identified second physical channel number is the same as a first physical channel number which is now being received; (c) determining whether or not the physical channel having the identified second physical channel number satisfies a predetermined condition if it is determined that the first and the second physical channel numbers are not the same; (d) switching so as to receive the physical channel having the identified second physical channel number, if it is determined that the physical channel having the second physical channel number does not satisfy the predetermined condition; (e) extracting a program map table packet identifier, corresponding to the second program number, from a program association table including the second program number; (f) switching so as to receive the physical channel having the identified second physical channel number and simultaneously extracting a program map table packet identifier, corresponding to the second program number, from one of the program association tables which have been transmitted as private data, if it is determined that the physical channel having the second physical channel number satisfies the predetermined condition; (g) extracting an elementary packet identifier, corresponding to the second program number, from a program map table including the extracted program map table packet identifier; and (h) extracting a packet having the extracted elementary packet identifier from a transport stream.

In still another embodiment, the predetermined condition is whether or not an absolute value representing a difference between the identified second physical channel number and the first physical channel number which is now being received is a predetermined value or less.

In still another embodiment, the predetermined condition is whether or not the identified second physical channel number is included in physical channel numbers which have been set beforehand.

In still another embodiment, the predetermined condition is whether or not the identified second physical channel number is included in a plurality of physical channel numbers which have ever been received.

In still another embodiment, the predetermined condition is whether or not the identified second physical channel number belongs to physical channel numbers which are frequently used by a viewer.

In still another embodiment, the physical channel numbers frequently used by the viewer are M kinds of physical channel numbers which have been selected most frequently from L kinds of physical channel numbers which have ever been selected in changing program numbers L times, where M and L are natural numbers and M is equal to or smaller than L.

According to another aspect of the present invention, a digital broadcast receiving apparatus for receiving a digital broadcast by transmitting a physical channel number for transmitting a program having a program number therethrough as a part of the program number is provided. The digital broadcast receiving apparatus includes: identification means for identifying a second physical channel number based on the second program number for transmitting a second program having a newly set program number or a second program number therethrough; determination means for determining whether or not the identified second physical channel number is the same as a first physical channel number which is now being received; and switching means for switching to receive the physical channel having the identified second physical channel number, if the determination means determines that the first and the second physical channel numbers are not the same.

According to still another aspect of the present invention, a method for switching programs in a digital broadcasting is provided. In this method, on a transmission side, a physical channel number for transmitting a program having a program number therethrough is assigned to a part of the program number and a program map table packet identifier corresponding to the program number in a program association table is assumed to be a fixed value, and on a receiving side, program association tables of all physical channels are stored into storage means and, in changing program numbers from a first program number into a second program number, the method includes the steps of: identifying a second physical channel number based on the second program number for transmitting a second program having the second program number therethrough; determining whether or not the identified second physical channel number is the same as a first physical channel number which is now being received; extracting a program map table packet identifier, corresponding to the second program number, from one of the program association tables which is stored in the storage means and includes the second program number, if it is determined that the first and the second physical channel numbers are the same; switching so as to receive the physical channel having the identified second physical channel number and simultaneously extracting a program map table packet identifier, corresponding to the second program number, from one of the program association tables which is stored in the storage means and includes the second program number, if it is determined that the first and the second physical channel numbers are not the same; extracting an elementary packet identifier, corresponding to the second program number, from a program map table including the extracted program map table packet identifier; and extracting a packet having the extracted elementary packet identifier from a transport stream.

According to still another aspect of the present invention, a method for switching programs in a digital broadcasting is provided. In this method, on a transmission side, a physical channel number for transmitting a program having a program number therethrough is assigned to a part of the program number and a program map table packet identifier corresponding to the program number in a program association table is assumed to be a fixed value, and on a receiving side, program association tables of physical channels satisfying a predetermined condition are stored in storage means and, in changing program numbers from a first program number to a second program number, the method includes the steps of: (a) identifying a second physical channel number based on the second program number for transmitting a second program having the second program number therethrough; (b) determining whether or not the identified second physical channel number is the same as a first physical channel number which is now being received; (c) determining whether or not the identified second physical channel number satisfies the predetermined condition if it is determined that the first and the second physical channel numbers are not the same; (d) switching so as to receive the physical channel having the identified second physical channel number, if it is determined that the second physical channel number does not satisfy the predetermined condition; (e) extracting a program map table packet identifier, corresponding to the second program number, from a program association table including the second program number after it has been determined that the first and the second physical channel numbers are the same in the step (b) or after the step (d) of switching for receiving the physical channel having the second physical channel number has been executed; (f) switching so as to receive the physical channel having the identified second physical channel number and simultaneously extracting a program map table packet identifier, corresponding to the second program number, from one of the program association tables which have been stored in the storage means, if it is determined that the second physical channel number satisfies the predetermined condition in the step (c); (g) extracting an elementary packet identifier, corresponding to the second program number, from a program map table including the extracted program map table packet identifier; and (h) extracting a packet having the extracted elementary packet identifier from a transport stream.

According to still another aspect of the present invention, a method for switching programs in a digital broadcasting is provided. In this method, on a transmission side, a physical channel number for transmitting a program having a program number therethrough is assigned to a part of the program number and a packet identifier for a program map table on which an identifier of a packet or a component of the program having the program number is described is assigned to the other part of the program number, and on a receiving side, in changing program numbers from a first program number to a second program number, the method includes the steps of: identifying a second physical channel number for transmitting a second program having the second program number therethrough and the packet identifier of the program map table based on the second program number; determining whether or not the identified second physical channel number is the same as a first physical channel number which is now being received; switching so as to receive the physical channel having the identified second physical channel number if it is determined that the first and the second physical channel numbers are not the same; extracting an elementary packet identifier, corresponding to the second program number, from a program map table including the identified program map table packet identifier;

and extracting a packet having the extracted elementary packet identifier from a transport stream.

According to still another aspect of the present invention, a digital broadcast receiving apparatus for receiving a digital broadcast by transmitting a physical channel number for transmitting a program having the program number therethrough as a part of the program number and a packet identifier for a program map table on which a packet identifier of a component of the program having the program number is described as the other part is provided. The digital broadcast receiving apparatus includes: identification means for identifying a second physical channel number for transmitting a second program and program map table packet identifier of the second program by a newly set program number of the second program; determination means for determining whether or not the identified second physical channel number is the same as a first physical channel number which is now being received; and switching means for receiving the physical channel having the identified second physical channel number, if the determination means determines that the first and the second physical channel numbers are not the same.

According to the present invention, it is possible to shorten the time required for changing the program numbers while switching physical channels and reduce a time difference between the case of switching physical channels and the case of changing program numbers in one and the same physical channel, so that the restlessness given to a viewer can be reduced.

In addition, by assigning a physical channel number and a program map table packet identifier to a part of a program number, it is possible not only to shorten the time required for changing the programs but also to save a memory region in a receiving apparatus in which a program association table is stored.

Thus, the invention described herein makes possible the advantage of reducing the restlessness given to a viewer by reducing as much as possible a time difference between the case of changing program numbers while switching physical channels and the case of changing program numbers without switching physical channels.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described in detail by way of illustrative examples with reference to the accompanying drawings.

Figure 1:
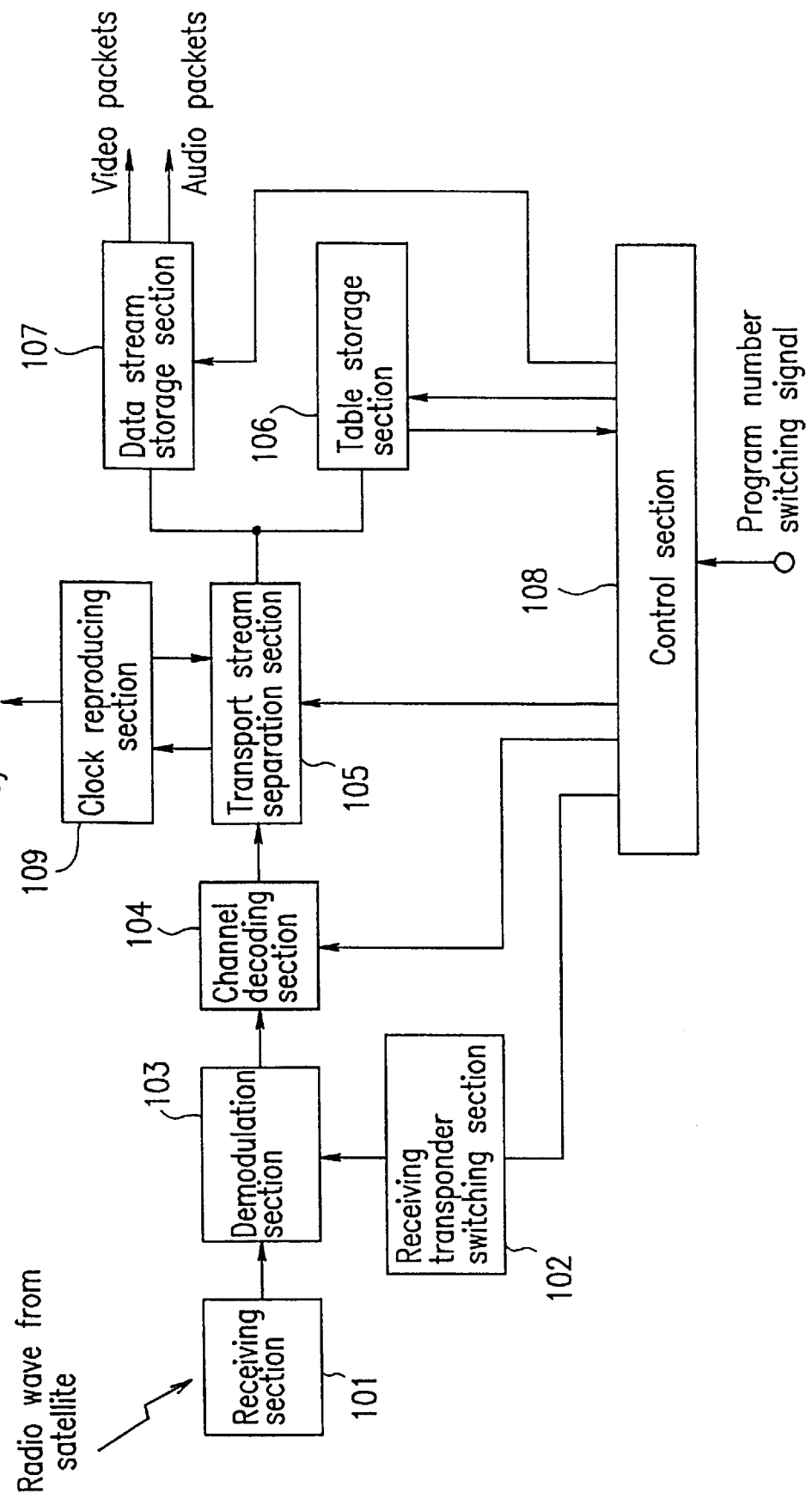
FIG. 1 is a diagram showing a configuration for a receiving apparatus according to the present invention.

FIG. 1 shows a configuration for a digital broadcast receiving apparatus commonly applicable in the first to the eleventh examples of the present invention. In the following description of the preferred embodiments, a propagation path is assumed to be an artificial satellite.

In FIG. 1, a receiving section 101 receives a radio wave (or bit streams) from a broadcasting satellite or a communication satellite; a receiving transponder switching section 102 switches the satellite transponders used for receiving (hereinafter, such a transponder will be referred to as a "receiving transponder"); a demodulation section 103 demodulates the received bit streams; a channel decoding section 104 performs Viterbi decoding, deinterleaving, error correction and the like, thereby reproducing transport packets; a transport stream separation section 105 separates the transport packets based on packet IDs (PIDs) and table IDs (TIDs); a table storage section 106 stores therein various kinds of program specific information (PSI) tables such as NITs, PATs and PMTs described above and private sections; a data stream storage section 107 stores therein video streams and audio streams; a clock reproducing section 109 reproduces system clocks based on a clock reference included in a transport stream; a control section 108, also functioning as an identification section and a determination section, controls the receiving transponder switching section 102, the demodulation section 103, the channel decoding section 104, the transport stream separation section 105, the table storage section 106, the data stream storage section 107 and the clock reproducing section 109.

EXAMPLE 1

Hereinafter, a method in accordance with a first example according to the present invention for switching the programs by the use of the digital broadcast receiving apparatus having such a configuration will be described in association with the operation of the apparatus.

Figure 2:
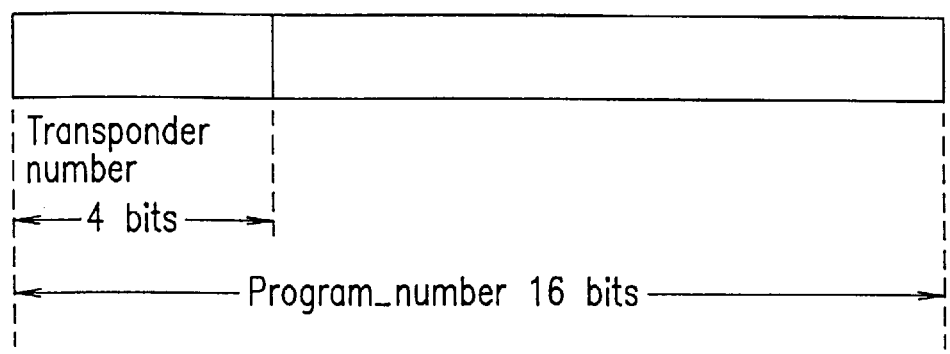
FIG. 2 is a diagram showing the assignment of a physical channel number to a program number.

In this example, the assignment pattern of a program number and a transport stream ID is specified on the transmission side as follows. That is to say, for example, an assignment pattern shown in FIG. 2 is used, i.e., the upper four bits out of sixteen bits, which are assigned to a program_number in compliance with the MPEG2 standard, are assumed to represent the number of a transponder or a physical channel number for transmitting a program having the program_number.

Moreover, the transponder numbers individually correspond to the transport stream IDs as shown in Table 1, for example.

TABLE 1

| transponder number | transport stream ID (represented hexadecimally) |
|---|---|
| 0 | 0x0000 |
| 1 | 0x0001 |
| 2 | 0x0002 |
| ... | ... |
| 15 | 0x000F |

Furthermore, the transport stream IDs, individually corresponding to the respective transponder numbers, correspond to the program numbers as shown in Table 2. These relationships are described on the network information table (NIT) mentioned above.

TABLE 2

| program number (represented hexadecimally) | transport stream ID (represented hexadecimally) |
|---|---|
| 0x0000 | 0x0000 |
| 0x0001 | 0x0000 |
| ... | 0x0000 |
| 0x0FFF | 0x0000 |
| 0x1000 | 0x0001 |
| 0x1001 | 0x0001 |
| ... | 0x0001 |
| 0x1FFF | 0x0001 |
| ... | ... |
| 0xF000 | 0x000F |
| 0xF001 | 0x000F |
| ... | 0x000F |
| 0xFFFF | 0x000F |

Figure 3:
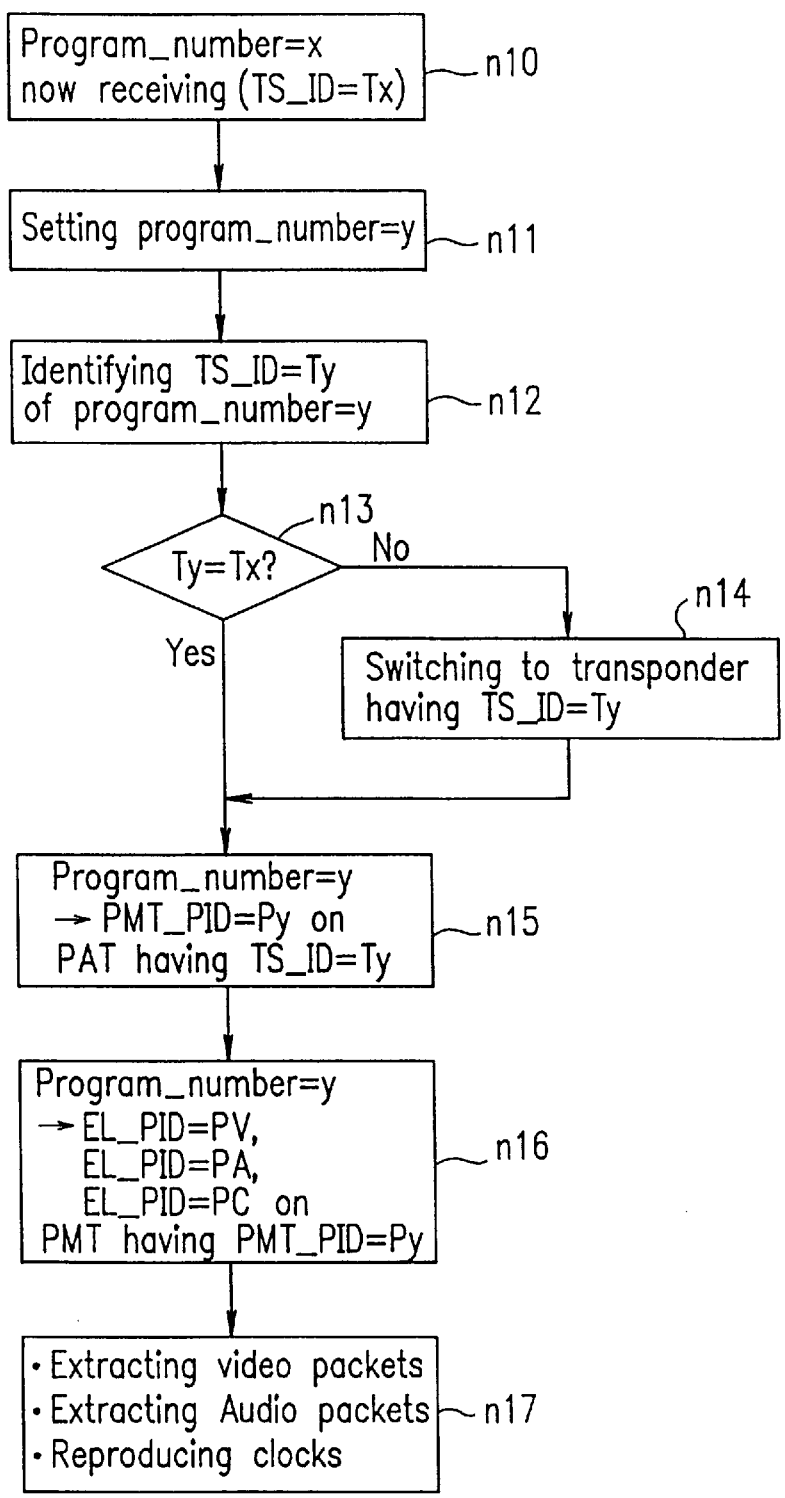
FIG. 3 is a flow chart for illustrating the operation according to a first example of the present invention.

Next, the processing executed for changing the programs in the first example will be described with reference to the flow chart shown in FIG. 3.

It is assumed that a program_number x=0x0001 (represented hexadecimally) is currently being received (at Step n10).

The operation of the receiving apparatus in such a case will be described with reference to FIG. 1. The demodulation section 103 has demodulated bit streams having a transponder number "0" based on Tables 1 and 2 and the transport stream separation section 105 has stored a program association table (PAT) having the transponder number "0" into the table storage section 106. More specifically, a specific PID (=0x00) is assigned to the PAT (in compliance with the MPEG2 standard), and the transport stream separation section 105 recognizes this PID and stores the PAT in a region of the table storage section 106. On this PAT, a PID of a program map table (PMT) or a PMT_PID corresponding to a program_number x is described.

The transport stream separation section 105 recognizes this PMT_PID and stores the PMT in a different region of the table storage section 106 from the region where the PAT is stored. The regions of the table storage section 106 where the PAT and the PMT are to be stored are decided by the control section 108. The control section 108 reads out elementary PIDs (or video streams and audio streams) corresponding to the program_number x which is described on the PMT and controls the transport stream separation section 105 to extract packets having the elementary PIDs from the transport streams. The control section 108 also reads out a PCR_PID (or a PID of a program clock reference) corresponding to the program_number x which is described on the PMT and controls the transport stream separation section 105 to extract a program clock reference (PCR). The video packets and the audio packets extracted by the transport stream separation section 105 are once stored into the data stream storage section 107 and then output to a video decoder and an audio decoder, respectively. The program clock reference (PCR) extracted by the transport stream separation section 105 is used as a reference for reproducing system clocks in the clock reproducing section 109.

Referring back to FIG. 3, when the viewer changes the program_number from x to y (≠x) to select the program_number y (at Step n11), the control section 108 checks the upper four bits of the program_number y so as to instantaneously identify to which transponder or transport stream ID the program_number y belongs (at Step n12); determines whether or not the transport stream ID of the program_number y is the same as the transport stream ID of the program x or whether or not the number of the selected transponder is the same as the receiving transponder (at Step n13); and, if the IDs or the numbers are not the same, controls the receiving transponder switching section 102, thereby switching the receiving transponders (at Step n14).

When the receiving transponder is switched to a transponder to which the program_number y belongs, the control section 108 stores a PAT having a new transport stream ID into the table storage section 106; extracts the PMT_PID of the program_number y from the PAT; stores the PMT having this PMT_PID into the table storage section 106 (at Step n15); finds elementary PIDs (EL_PIDs) corresponding to the program_number=y on the PMT having the packet identifier (at Step n16); and extracts the video packets, the audio packets and the program clock references (PCRs) having the elementary PIDs, thereby performing video decoding and audio decoding and reproducing the clocks (at Step n17).

Figure 17:
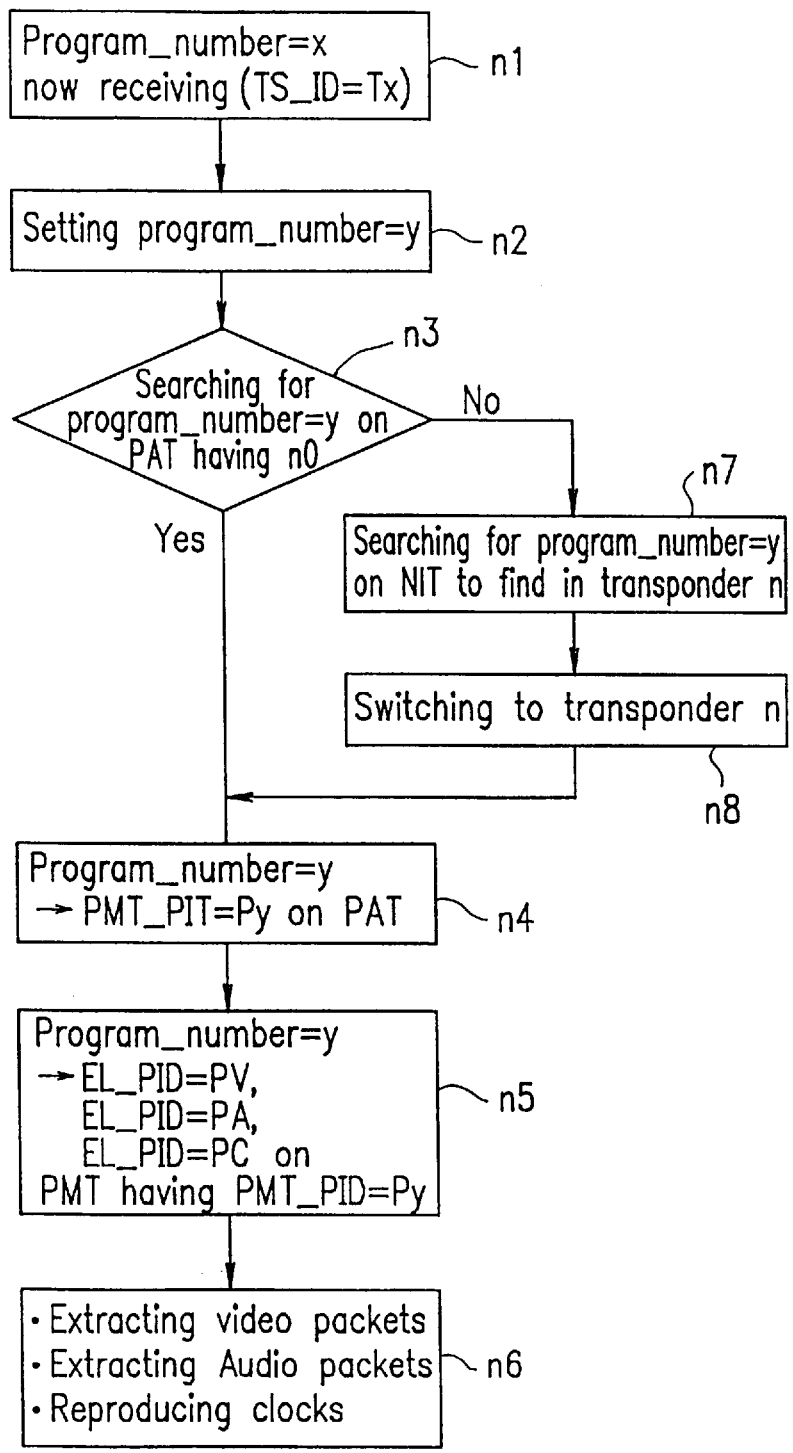
FIG. 17 is a flow chart for illustrating the operation of a receiving apparatus according to a conventional example.

In the conventional example shown in FIG. 17, how to number the programs has nothing to do with transponder numbers. However, in the first example, a transponder number is assigned to the upper four bits of a program number, so that, in changing the program numbers while switching the transponders, it is no longer necessary to perform a search on an NIT to determine to which transponder number (or transport stream ID) the newly selected program number belongs. As a result, it is possible to shorten the time required for changing the program numbers while switching the transponders by the time during which a transponder corresponding to the program number is searched for on an NIT as compared with a conventional example. Consequently, it is possible to reduce a time difference between a time required for switching the program numbers while switching the transponders and a time required for switching the program numbers without switching the transponders, thereby reducing the restlessness of a viewer.

EXAMPLE 2

Next, a second example of the present invention will be described.

The fundamental configuration of the digital broadcast receiving apparatus in the second example is the same as that in the first example and is shown in FIG. 1.

In this second example, it is also assumed that a transponder number or a physical channel number is assigned to the upper four bits of a program number and that the relationship between a transponder number and a transport stream ID and the relationship between a transport stream ID and a program number are defined as shown in Tables 1 and 2, respectively, in the same way as in the first example.

In the second example, the PATs of all the transponders (a maximum number of the PATs is 16 in this case) are transmitted in the form of a private section complying with the MPEG2 standard from the transmission side. In other words, it is always possible to receive the PATs of all the transponders irrespective of which transponder is received.

In this example, the section_syntax_indicator of the private section is set to be "1", a transport stream ID is described on the table_id_extension and a similar association between program numbers and PIDs to the PAT is described on the private_data_byte.

Figure 4:
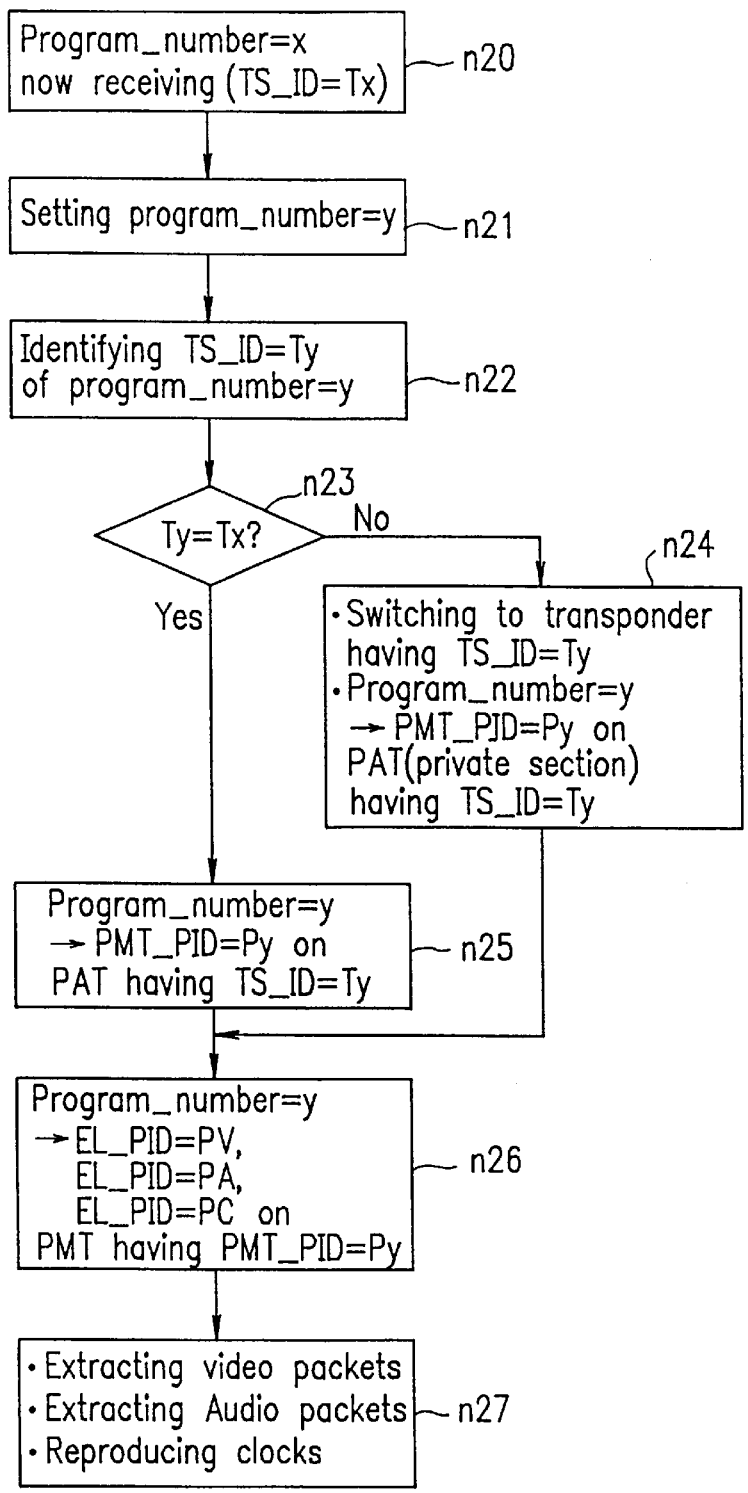
FIG. 4 is a flow chart for illustrating the operation according to a second example of the present invention.

Next, the processing executed in the case of changing the program numbers in the second example will be described with reference to the flow chart shown in FIG. 4.

In the second example, even when a program_number x is being received (at Step n20), the PATs of all the transponders other than the transponder to which the program_number x belongs are also received in the form of a private section. In the receiving apparatus shown in FIG. 1, the private section in which these PATs are described is stored in a region of the table storage section 106 which is decided by the control section 108. The private section is identified by the transport stream ID described on the table_id_extension.

When the viewer changes the program_number from x to y (≠x) to select the program_number y (at Step n21), the control section 108 checks the upper four bits of the program_number y so as to instantaneously identify to which transponder or transport stream ID the program_number y belongs (at Step n22); determines whether or not the transport stream ID of the program_number y is the same as the transport stream ID of the program_number x (at Step n23); and, if the IDs are not the same, controls the receiving transponder switching section 102, thereby switching the receiving transponders (at Step n24). In the second example, in parallel with switching the receiving transponders, the control section 108 reads out a PAT having the transport stream ID (corresponding to the transponder number) of the program_number y, thereby extracting a PMT_PID corresponding to the program_number y (at Step n24). In this case, the PAT has been transmitted in the form of a private section from the transmission side and has been stored in the table storage section 106.

In the case where the transponder of the program_number y is the same as the transponder of the program_number x and it is not necessary to switch the receiving transponders, the control section 108 extracts a PMT_PID on the PAT (not the private section) of the transponder of the program_number x (at Step n25). The remaining processing after the control section 108 has extracted the PMT_PID is the same as that of the first example (at Steps n26 and n27).

In the second example, in the case where it is necessary to switch the transponders for changing the program numbers, the extraction of a PMT_PID on a PAT and the switching of the transponders are performed at the same time or in parallel with each other (at Step n24). Consequently, it is possible to further shorten the time required for changing the program numbers while switching the transponders as compared with the first example, thereby further reducing the restlessness of a viewer.

EXAMPLE 3

Next, a third example of the present invention will be described.

The fundamental configuration of the digital broadcast receiving apparatus in the third example is the same as that in the previous examples and is shown in FIG. 1.

In this third example, it is also assumed that a transponder number or a physical channel number is assigned to the upper four bits of a program number and that the relationship between a transponder number and a transport stream ID and the relationship between a transport stream ID and a program number are defined as shown in Tables 1 and 2, respectively, in the same way as in the first example.

In the third example, the PATs of all the transponders (a maximum number of the PATs is 16 in this case) are transmitted in the form of a private section complying with the MPEG2 standard from the transmission side, in the same way as in the second example.

Figure 5:
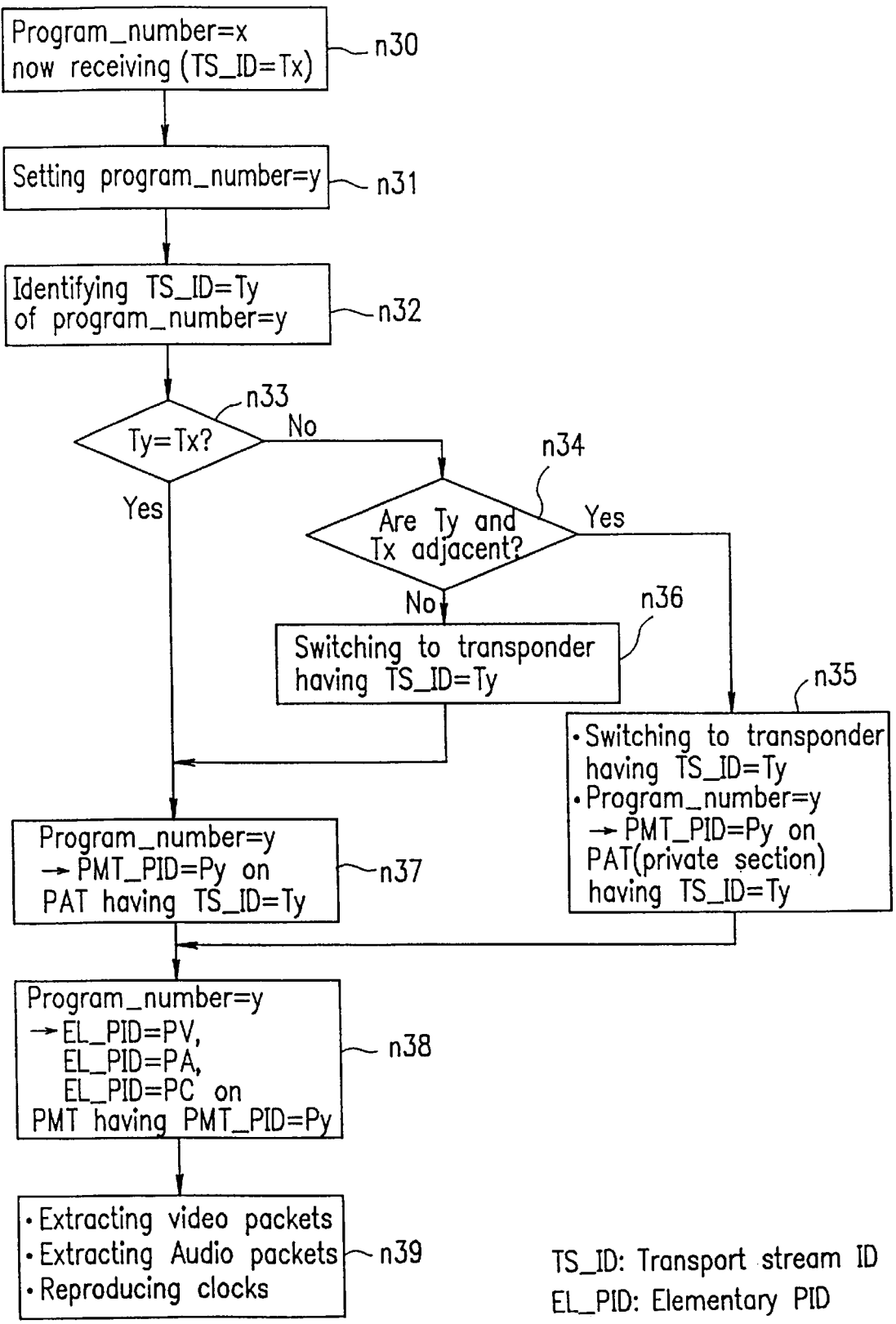
FIG. 5 is a flow chart for illustrating the operation according to a third example of the present invention.

Next, the processing executed in the case of changing the program numbers in the third example will be described with reference to the flow chart shown in FIG. 5.

In the third example, even when a program_number x is being received (at Step n30), the receiving apparatus receives and stores in the form of a private section the PATs of the transponders, which are other than the transponder to which the program_number x belongs (or of which the transport stream ID=Tx) and have transponder numbers adjacent to the number of the transponder to which the program_number x belongs. The private section in which these PATs are described is stored in a region of the table storage section 106 which is decided by the control section 108.

In this case, an "adjacent transponder" is a transponder of which the transport stream ID is represented as (Tx±Tp) (where Tp is a natural number smaller than the total number of the transponders). Assuming that the total number of the transponders is 16, Tp can be set in the range from 2 to 5, for example. The value may be set beforehand by the receiving apparatus or by a viewer following a manual.

When the viewer changes the program_number from x to y (≠x) to select the program_number y (at Step n31), the control section 108 checks the upper four bits of the program_number y so as to instantaneously identify to which transponder or transport stream ID the program_number y belongs (at Step n32). Next, as a first determination step, the control section 108 determines whether or not the transport stream ID=Ty of the program y is the same as the transport stream ID=Tx of the program_number x (at Step n33). If the IDs are not the same, as a second determination step, the control section 108 determines whether or not a transponder adjacency reference |Ty−Tx|≦Tp is satisfied (at Step n34). If the transponder adjacency reference is satisfied, then the control section 108 switches the receiving transponders and, in parallel with switching, reads out a PAT having the transport stream ID=Ty of the program_number y from the table storage section 106, thereby extracting a PMT_PID corresponding to the program_number y, in the same way as in the second example (at Step n35). On the other hand, if Ty and Tx do not satisfy the transponder adjacency condition, then the control section 108 switches the receiving transponders (at Step n36) and then receives a PAT having the transport stream ID=Ty and newly stores the PAT into the table storage section 106, thereby extracting a PMT_PID corresponding to the program_number y (at Step n37). The remaining processing after the control section 108 has extracted the PMT_PID is the same as that of the first example (at Steps n38 and n39).

In the third example, in the case where it is necessary to switch the transponders for changing the program numbers, if the newly selected transponder belongs to the transponders adjacent to the original transponder, then the extraction of a PMT_PID on a PAT and the switching of the transponders are performed at the same time or in parallel with each other. Consequently, it is possible to further shorten the time required for changing the program numbers while switching the transponders as compared with the first example.

Furthermore, unlike the second example in which the PATs of all the transponders are received and stored into a memory, the PATs of the adjacent transponders are received in the form of a private section and then stored into a memory in the third example. Consequently, it is possible to reduce the capacity of a memory as compared with the second example.

EXAMPLE 4

Next, a fourth example of the present invention will be described.

The fundamental configuration of the digital broadcast receiving apparatus in the fourth example is the same as that in the previous examples and is shown in FIG. 1.

In this fourth example, it is also assumed that a transponder number or a physical channel number is assigned to the upper four bits of a program number and that the relationship between a transponder number and a transport stream ID and the relationship between a transport stream ID and a program number are defined as shown in Tables 1 and 2, respectively, in the same way as in the first example.

In the fourth example, the PATs of all the transponders (a maximum number of the PATs is 16 in this case) are transmitted in the form of a private section complying with the MPEG2 standard from the transmission side, in the same way as in the third example.

Figure 6:
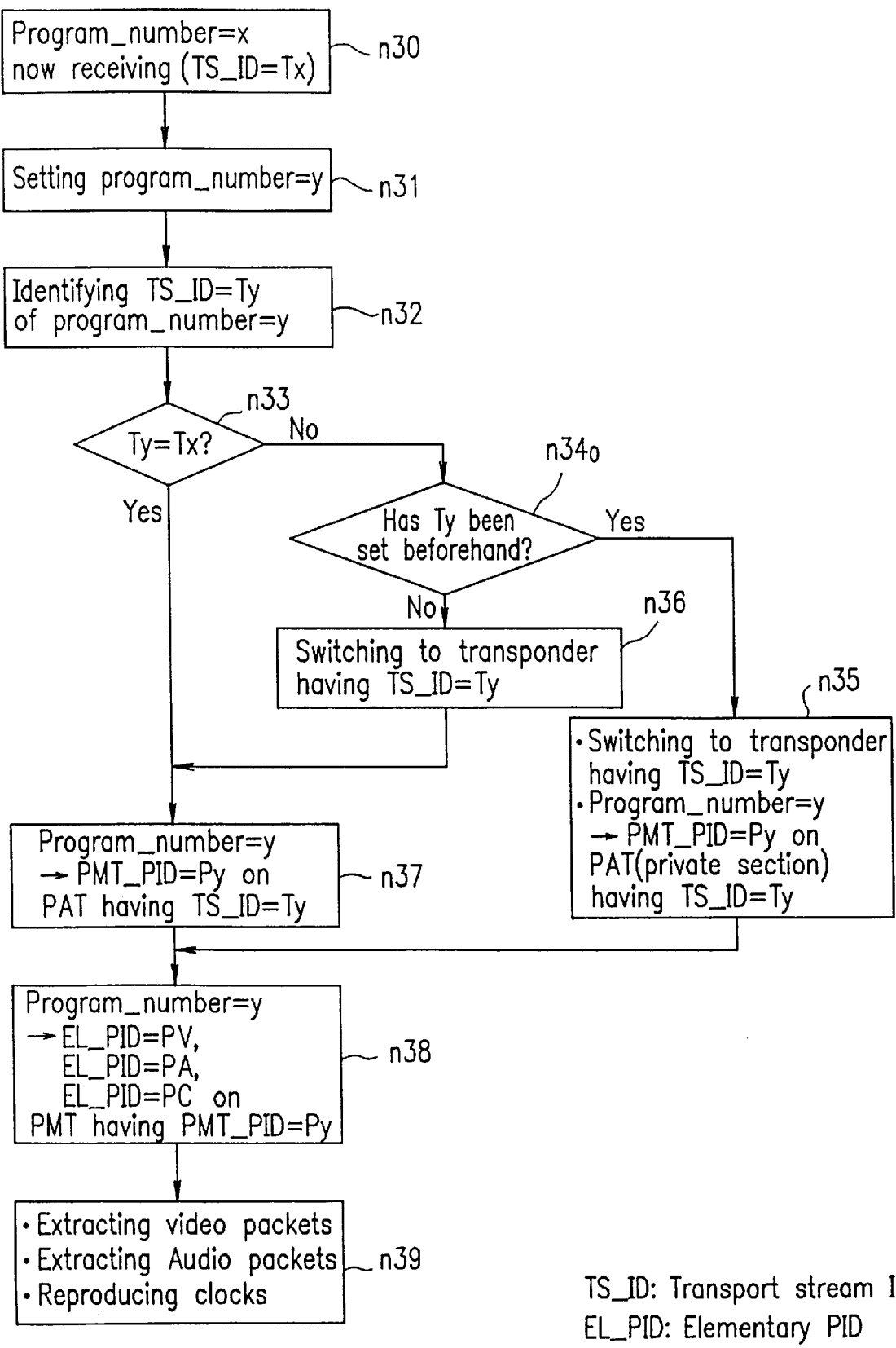
FIG. 6 is a flow chart for illustrating the operation according to a fourth example of the present invention.

Next, the processing executed in the case of changing the program numbers in the fourth example will be described with reference to the flow chart shown in FIG. 6.

In the third example, Step n34 or a step of determining whether or not the transponder of an original program number is adjacent to the transponder of a newly set program number in the case of changing the program numbers is provided. In the fourth example, this Step n34 is replaced by a step of determining whether or not the transport stream ID of the newly set program number belongs to the transport stream IDs which have been set beforehand by a viewer in the receiving apparatus or Step n34$_0$.

If the transport stream ID of the newly set program number belongs to the transport stream IDs which have been set beforehand by a viewer in the receiving apparatus, the control section 108 switches the receiving transponders and, in parallel with switching, reads out a PAT, which has the transport stream ID=Ty of the program_number y and has been transmitted in the form of a private section, from the table storage section 106, thereby extracting a PMT_PID corresponding to the program_number y (at Step n35). On the other hand, if the transport stream ID of the newly set program number does not belong to the transport stream IDs which have been set beforehand by a viewer in the receiving apparatus, the control section 108 switches the receiving transponders (at Step n36) and then receives a PAT having the transport stream ID=Ty and newly stores the PAT into the table storage section 106, thereby extracting a PMT_PID corresponding to the program_number y (at Step n37). The remaining processing is the same as that of the third example.

In the fourth example, a process step in the third example of determining whether or not the transponder of an original program number is adjacent to the transponder of a newly set program number in the case of changing the program numbers is replaced by a process step of determining whether or not the transport stream ID of the newly set program number belongs to the transport stream IDs which have been set beforehand by a viewer in the case of changing the programs. Consequently, it is possible to shorten the time required for changing the programs while switching from the transponder to a transponder having any of the transport stream IDs set by the viewer beforehand and reduce a time difference between a time required for changing the program with switching the transponder and a time required for changing the programs without switching the transponders, thereby reducing the restlessness of a viewer.

EXAMPLE 5

Next, a fifth example of the present invention will be described.

The fundamental configuration of the digital broadcast receiving apparatus in the fifth example is the same as that in the previous examples and is shown in FIG. 1.

In this fifth example, it is also assumed that a transponder number or a physical channel number is assigned to the upper four bits of a program number and that the relationship between a transponder number and a transport stream ID and the relationship between a transport stream ID and a program number are defined as shown in Tables 1 and 2, respectively, in the same way as in the first example.

In the fifth example, the PATs of all the transponders (a maximum number of the PATs is 16 in this case) are transmitted in the form of a private section complying with the MPEG2 standard from the transmission side, in the same way as in the third example.

Figure 7:
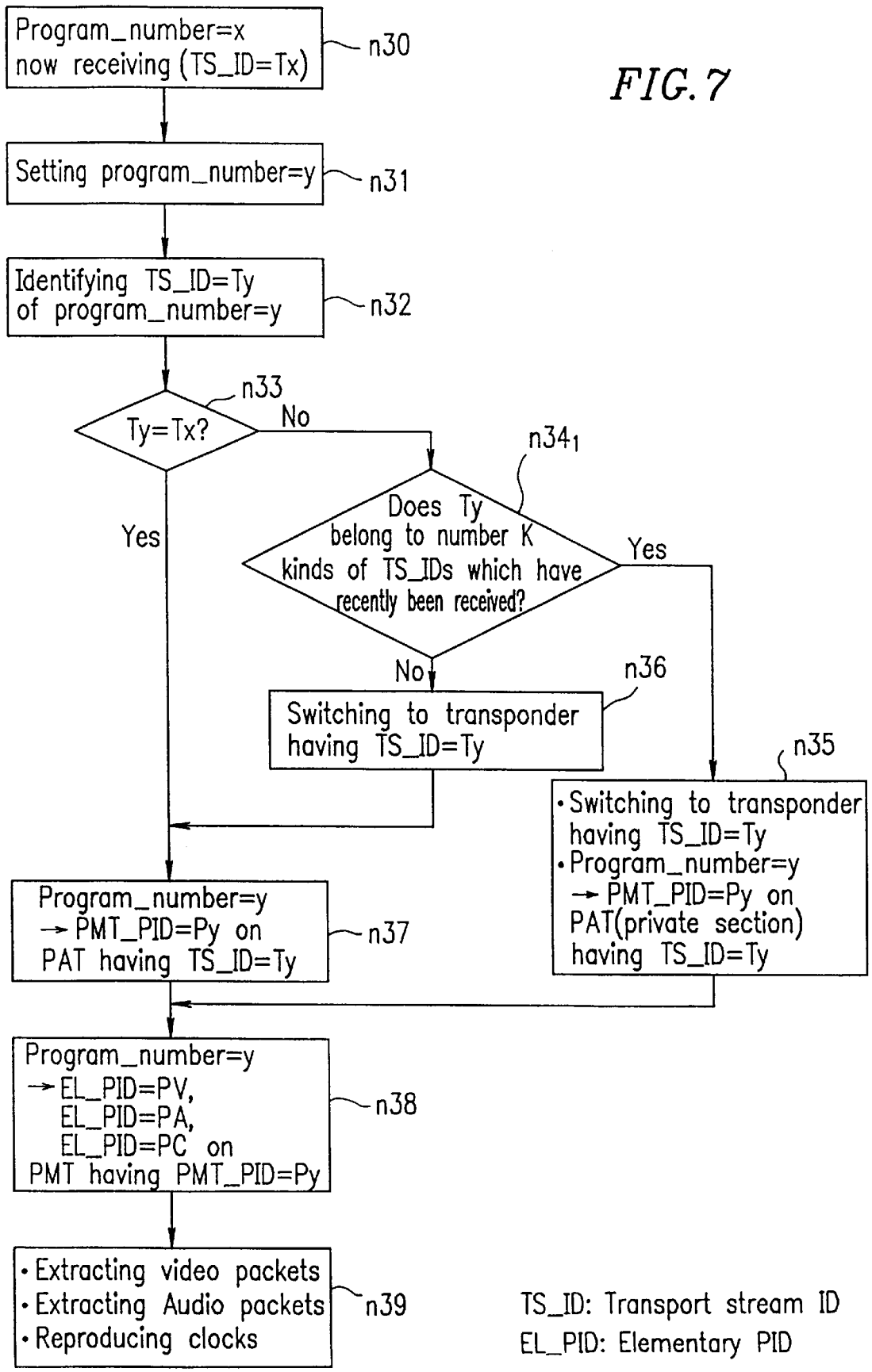
FIG. 7 is a flow chart for illustrating the operation according to a fifth example of the present invention.

Next, the processing executed in the case of changing the program numbers in the fifth example will be described with reference to the flow chart shown in FIG. 7.

In the third example, Step n34 or a step of determining whether or not the transponder of an original program number is adjacent to the transponder of a newly set program number in the case of changing the program numbers is provided. In the fifth example, this Step n34 is replaced by a step of determining whether or not the transport stream ID of the newly set program number is included in the transport stream IDs of number K (where K is a natural number) kinds of different transponders which have recently been used for receiving or Step n34$_1$. That is to say, one of the PATs which has been transmitted in the form of private sections (or a private section) and has the same transport stream ID as any of the transport stream IDs of number K kinds of different transponders which have recently been used for receiving is decided by the control section 108 and stored into the table storage section 106. The value of K can be set in the range from 2 to 6, for example. Alternatively, K may be larger than 6. If the transport stream ID of the newly set program number is the same as any of the transport stream IDs of number K kinds of different transponders which have recently been used for receiving, the control section 108 switches the receiving transponders and, in parallel with switching, reads out a PAT, which has the transport stream ID=Ty of the program_number y and has been transmitted in the form of a private section, from the table storage section 106, thereby extracting a PMT_PID corresponding to the program_number y (at Step n35). On the other hand, if the transport stream ID of the newly set program number is not the same as any of the transport stream IDs of number K kinds of different transponders which have recently been used for receiving, the control section 108 switches the receiving transponders (at Step n36) and then receives a PAT having the transport stream ID=Ty and newly stores the PAT into the table storage section 106, thereby extracting a PMT_PID corresponding to the program_number y (at Step n37). The remaining processing is the same as that of the third example.

In the fifth example, a process step in the third example of determining whether or not the transponder of an original program number is adjacent to the transponder of a newly set program number in the case of changing the program numbers is replaced by a step of determining whether or not the transport stream ID of the newly set program number belongs to the transport stream IDs of number K kinds of different transponders which have recently been used for receiving in the case of changing the program numbers. Consequently, it is possible to shorten the time required for changing the programs while switching the transponder to any of the number K of transponders which have recently been used for receiving and reduce a time difference between a time required for changing the programs with switching the transponders and a time required for changing the programs without switching the transponders, so that the restlessness of a viewer can be reduced.

EXAMPLE 6

Next, a sixth example of the present invention will be described.

The fundamental configuration of the digital broadcast receiving apparatus in the sixth example is the same as that in the previous examples and is shown in FIG. 1.

In this sixth example, it is also assumed that a transponder number or a physical channel number is assigned to the upper four bits of a program number and that the relationship between a transponder number and a transport stream ID and the relationship between a transport stream ID and a program number are defined as shown in Tables 1 and 2, respectively, in the same way as in the first example.

In the sixth example, the PATs of all the transponders (a maximum number of the PATs is 16 in this case) are transmitted in the form of a private section complying with the MPEG2 standard from the transmission side, in the same way as in the third example.

Figure 8:
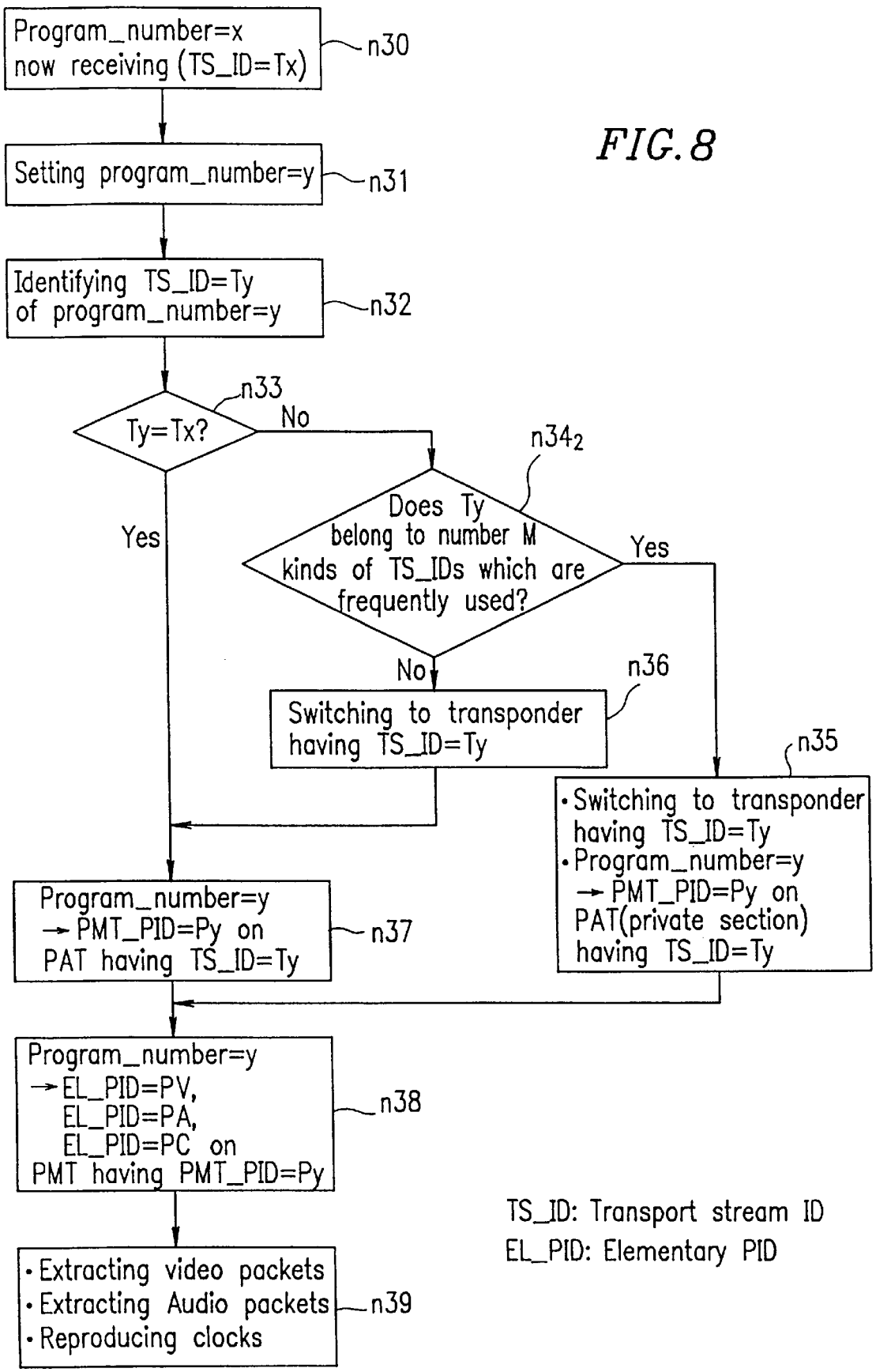
FIG. 8 is a flow chart for illustrating the operation according to a sixth example of the present invention.

Next, the processing executed in the case of changing the program numbers in the sixth example will be described with reference to the flow chart shown in FIG. 8.

In the third example, Step n34 or a step of determining whether or not the transponder of an original program number is adjacent to the transponder of a newly set program number in the case of changing the program numbers is provided. In the sixth example, Step n34 is replaced by a step of determining whether or not the transport stream ID of the newly selected program number is included in the transport stream IDs of the transponders which are frequently used by a viewer or Step n34$_2$.

The transport stream IDs of the transponders which are frequently used by a viewer are assumed to be a number M of transport stream IDs (where M is a natural number). The number M of transport stream IDs have been selected most frequently from a number L of transport stream IDs (where L is also a natural number) of the same number of transponders, which have been set in changing the program numbers L times. For example, the values of L and M may be 40 and 5, respectively. However, the value of M may be set at any arbitrary number so long as the number does not exceed the total number of the transponders or the number of the receivable physical channels.

One of the PATs transmitted in the form of a private section which has the same transport stream ID as any of the transport stream IDs of the transponders frequently used by a viewer is decided and then stored into the table storage section 106 by the control section 108. If the transport stream ID of the newly set program number is the same as any of the transport stream IDs of the transponders which are frequently used by a viewer, the control section 108 switches the receiving transponders and, in parallel with switching, reads out a PAT, which has the transport stream ID=Ty of the program_number y, from the table storage section 106, thereby extracting a PMT_PID corresponding to the program_number y (at Step n35). On the other hand, if the transport stream ID of the newly set program number is not the same as any of the transport stream IDs of the transponders which are frequently used by a viewer, the control section 108 switches the receiving transponders (at Step n36) and then receives a PAT having the transport stream ID=Ty and newly stores the PAT into the table storage section 106, thereby extracting a PMT_PID corresponding to the program_number y (at Step n37). The remaining processing is the same as that of the third example.

In the sixth example, a process step in the third example of determining whether or not the transponder of an original program number is adjacent to the transponder of a newly set program number in the case of changing the program numbers is replaced by a step of determining whether or not the transport stream ID of the newly set program number belongs to the transport stream IDs of the transponders which are frequently used by a viewer. Consequently, it is possible to shorten the time required for changing the program numbers while switching the transponder to any of the transponders which are frequently used by a viewer and reduce a time difference between a time required for changing the program numbers with switching the transponders and a time required for changing the program numbers without switching the transponders, so that the restlessness of a viewer can be reduced.

EXAMPLE 7

Next, a seventh example of the present invention will be described.

The fundamental configuration of the digital broadcast receiving apparatus in the seventh example is the same as that of the previous examples and is shown in FIG. 1. In this seventh example, it is also assumed that a transponder number or a physical channel number is assigned to the upper four bits of a program number and that the relationship between a transponder number and a transport stream ID and the relationship between a transport stream ID and a program number are defined as shown in Tables 1 and 2, respectively, in the same way as in the first example.

Hereinafter, a method in the seventh example for switching the programs by the use of the digital broadcast receiving apparatus having the configuration described in the first example will be described in association with the operation of the apparatus.

First, when a power is initially supplied to the receiving apparatus, the control section 108 makes the receiving transponder switching section 102 sequentially switch the received frequencies in the demodulation section 103, thereby sequentially receiving all of the physical channels. Then, the transport stream separation section 105 sequentially extracts the program association tables (PATs) of the respective physical channels from the transport streams transmitted through the respective physical channels and then stores the PATs into the table storage section 106. The control section 108 extracts an NIT from a transport stream and then stores the NIT into a region in the table storage section 106.

More specifically, since a specific PID (=0x00 represented hexadecimally) is assigned to each PAT (in compliance with the MPEG2 standard), and a transport_stream_id is assigned to the PAT of a transport stream in each physical channel, the transport stream separation section 105 stores the PAT into a predetermined region in the table storage section 106 based on these values.

Figure 9:
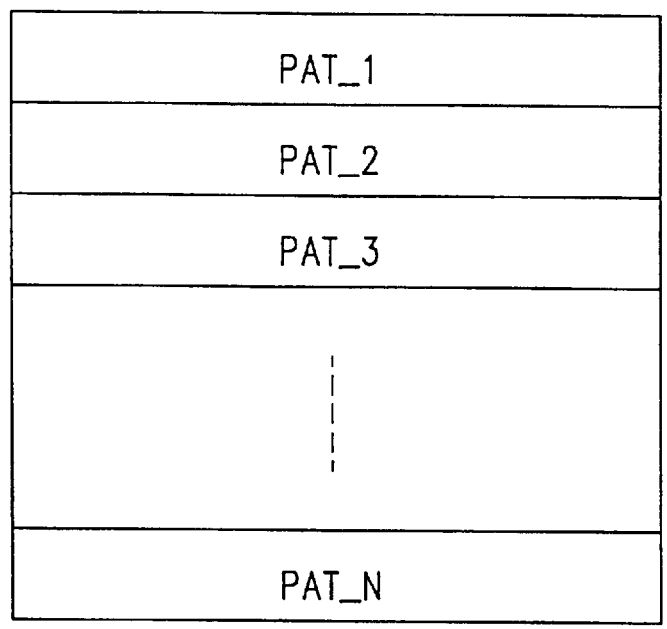
FIG. 9 is a diagram showing a part of a table storage section according to a seventh example of the present invention.

FIG. 9 shows how the PATs are stored in the table storage section 106. As shown in FIG. 9, a plurality of PATs corresponding to the respective physical channels are stored in the individual regions of the table storage section 106 as indicated by PAT_1, PAT_2, . . . and PAT_N. In this case, N is the total number of the physical channels or the number of the satellite transponders if the propagation path is a satellite.

Figure 10:
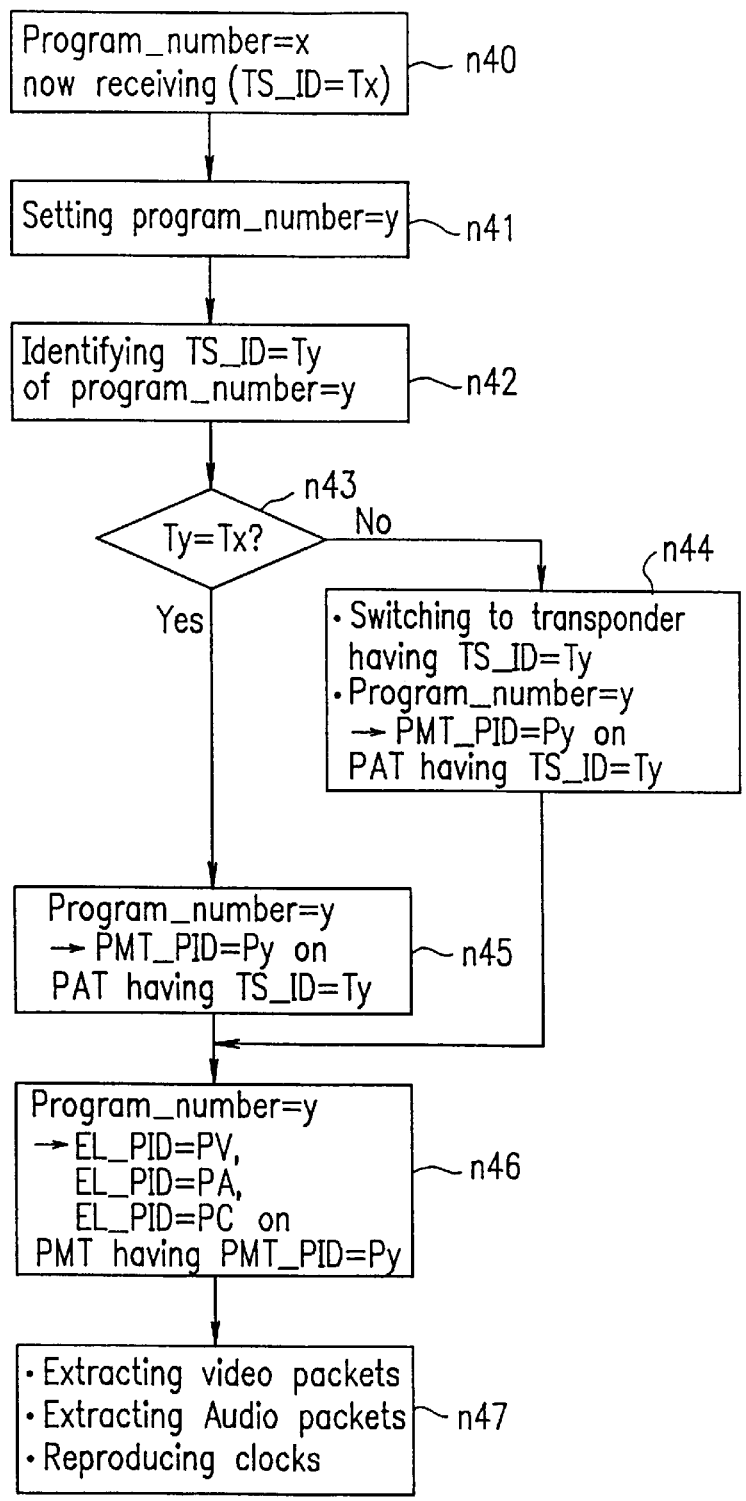
FIG. 10 is a flow chart for illustrating the operation according to the seventh example of the present invention.

Next, the processing executed in the case of changing the program numbers in the seventh example will be described with reference to the flow chart shown in FIG. 10. In this example, it is assumed that a program_number x=0x0001 (represented hexadecimally) is now being received (at Step n40).

The operation of the receiving apparatus in such a case will be described with reference to FIG. 1. The demodulation section 103 has demodulated bit streams having a physical channel number=0 (transport stream ID=0) based on Tables 1 and 2 and the PATs (PAT_1, PAT_2, . . . and PAT_N) of all of the physical channels are stored in the table storage section 106, as mentioned above. Herein, the PAT of the transport stream which is now being received is assumed to be PAT_x.

On the PAT_x, the PID of a program map table (PMT) or a PMT_PID corresponding to a program_number x is described.

The transport stream separation section 105 recognizes this PMT_PID and then stores the PMT in a different region of the table storage section 106 from the regions where the PAT and the NIT are stored. The regions in the table storage section 106 where the PAT and the PMT are stored are decided by the control section 108.

The control section 108 reads out elementary PIDs (or the PIDs of video streams and audio streams) which correspond to the program_number x and are described on the PMT and controls the transport stream separation section 105 to extract packets having the elementary PIDs from the transport streams. The control section 108 also reads out a PCR_PID (or a PID of a program clock reference) which corresponds to the program_number x and is described on the PMT and controls the transport stream separation section 105 to extract a program clock reference (PCR). The video packets and the audio packets extracted by the transport stream separation section 105 are stored into the data stream storage section 107 and then output to a video decoder and an audio decoder, respectively. The program clock reference (PCR) extracted by the transport stream separation section 105 is used as a reference for reproducing system clocks in the clock reproducing section 109.

Referring back to FIG. 10, when the viewer changes the program_number from x to y (≠x) to select the program_number y (at Step n41), the control section 108 checks the upper four bits of the program_number y so as to instantaneously identify to which transponder or transport stream ID the program_number y belongs (at Step n42); determines whether or not the transport stream ID of the program_number y is the same as the transport stream ID of the program_number x or the number of the transponder which is now used for receiving (at Step n43); and, if the IDs are not the same, controls the receiving transponder switching section 102, thereby switching the receiving transponders (at Step n44). In parallel with the switching of the transponders, the control section 108 identifies the PAT of the newly selected transport stream which is stored in the table storage section 106 (herein, this PAT is assumed to be PAT_y) based on the transport stream ID and then extracts a PMT_PID corresponding to the newly selected program number based on the PAT_y (at Step n44).

If the transponder for transmitting a program having the program_number y is the same as the transponder for transmitting a program having the program_number x and it is not necessary to switch the receiving transponders, the control section 108 extracts a PMT_PID on the PAT (=PAT_x) of the transponder having the program_number x.

The control section 108 sets the transport stream separation section 105 to extract a PMT having the PMT_PID which has been extracted at Step n44 or n45. Following this setting, the transport stream separation section 105 extracts this PMT. Then, the control section 108 finds elementary PIDs (EL_PIDs) and a program clock reference PID (PCR_PID) corresponding to the program_number=y on the PMT (at Step n46) and extracts the video packets, the audio packets and the program clock reference (PCR) of the PCR_PID having the elementary PIDs, thereby performing video decoding and audio decoding and reproducing the clocks (at Step n47).

In this example, in changing the program numbers while switching the transponders, the extraction of a PMT_PID from a PAT which has been stored beforehand in the receiving apparatus is executed at the same time or in parallel with the switching of the transponders. Consequently, the time required for changing the programs can be shortened as compared with a conventional example by the time required for capturing a PAT after switching the transponders and the time required for extracting a PMT_PID on the captured PAT.

As a result, it is possible to reduce a time difference between a time required for changing the program numbers while switching the transponders and a time required for changing the program numbers without switching the transponders, so that the restlessness of a viewer can be reduced.

EXAMPLE 8

Next, an eighth example of the present invention will be described.

The fundamental configuration of the digital broadcast receiving apparatus in the eighth example is the same as that of the previous examples and is shown in FIG. 1.

In this eighth example, it is also assumed that a transponder number is assigned to the upper four bits of a program number and that the relationship between a transponder number and a transport stream ID and the relationship between a transport stream ID and a program number are defined as shown in Tables 1 and 2, respectively, in the same way as in the first example.

Figure 11:
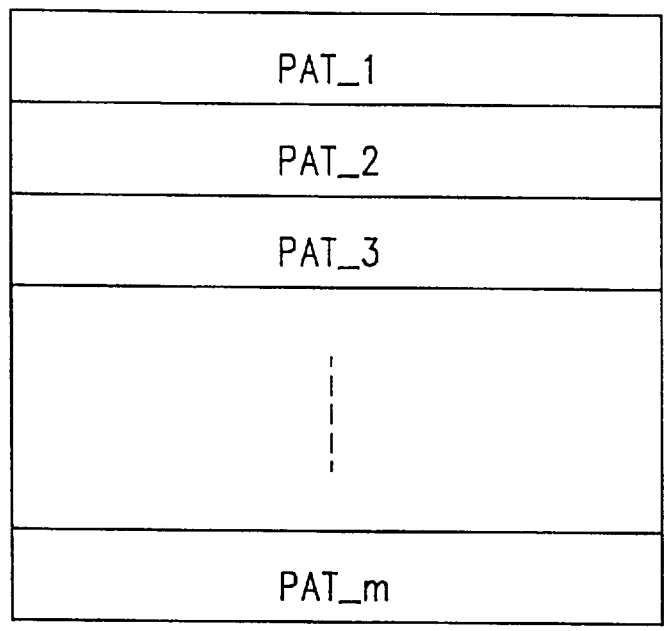
FIG. 11 is a diagram showing a part of a table storage section according to an eighth example of the present invention.

In this eighth example, it is assumed that a viewer sets the physical channels, through which PATs of transport streams are received into the receiving apparatus, when power is initially supplied to the receiving apparatus. The number of the physical channels set by the viewer for receiving the PATs into the receiving apparatus therethrough is assumed to be m, where m is a natural number equal to or smaller than the total number N of the physical channels (or the total number of the transponders). For example, the viewer may set his favorite physical channel number(s) or transport stream ID(s) in this case. The control section 108 of the receiving apparatus sequentially stores the PAT (PID=0x00) of one transport stream or the PATs of a plurality of transport streams, corresponding to the physical channel number(s) set by the viewer, into the table storage section 106 while changing the received frequencies. FIG. 11 shows the PAT storage region in the table storage section 106 in such a case. In this eighth example, PAT_1, . . . and PAT_m are the PATs of the physical channels set by the viewer.

Figure 12:
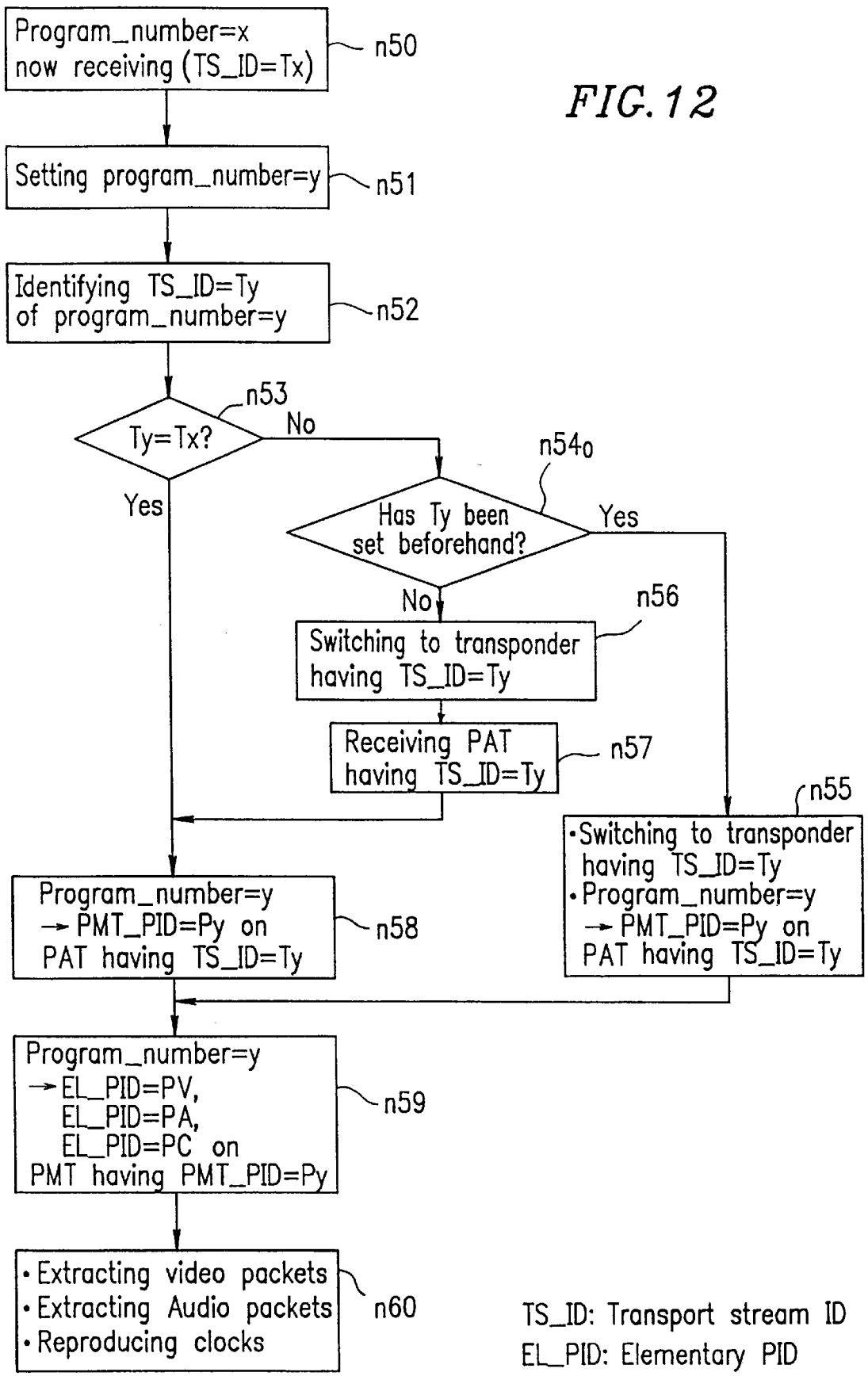
FIG. 12 is a flow chart for illustrating the operation according to the eighth example of the present invention.

Next, the processing executed in the case of changing the program numbers in the eighth example will be described with reference to the flow chart shown in FIG. 12.

When the viewer changes the program_number from x to y (≠x) to select the program_number y (at Step n51), the control section 108 checks the upper four bits of the program_number y so as to instantaneously identify to which transponder or transport stream ID the program_number y of the program belongs (at Step n52). Next, as a first determination step, the control section 108 determines whether or not the transport stream ID=Ty of the program_number y is the same as the transport stream ID=Tx of the program_number x (at Step n53). If the IDs are not the same, as a second determination step, the control section 108 determines whether or not the transport stream ID of the program_number y is the same as the transport stream ID of any of the physical channels which have been set beforehand by the viewer in the receiving apparatus (at Step n54$_0$).

If it is determined in the second determination step that the transport stream ID=Ty of the newly set program_number y is the same as the transport stream ID of any of the physical channels which have been set beforehand by the viewer in the receiving apparatus, then the control section 108 switches the receiving transponders and, in parallel with switching, extracts a PMT_PID corresponding to the program_number y from the PAT_y stored in the table storage section 106 (at Step n55).

On the other hand, if it is determined in the second determination step that the transport stream ID=Ty of the newly set program_number y is not the same as the transport stream ID of any of the physical channels which have been set beforehand by the viewer in the receiving apparatus, then the control section 108 switches the receiving transponders (at Step n56) and then receives a PAT having the transport stream ID=Ty (at Step n57) and newly stores the PAT in the table storage section 106, thereby extracting a PMT_PID=Py corresponding to the program_number y (at Step n58). The remaining processing is the same as that of the first example.

In the eighth example, in the case where it is necessary to switch the transponders for changing the program numbers, if the transport stream ID of a newly set program number belongs to the physical channel numbers (or transport stream IDs) which have been set beforehand by the viewer in the receiving apparatus, the extraction of a PMT_PID on a PAT and the switching of the transponders are performed at the same time or in parallel with each other. As a result, the time required for switching the programs between the physical channels which have been set by the viewer in the receiving apparatus can be shortened as compared with a conventional example and a difference between the time required for changing the programs while switching the transponders and a time required for changing the programs without switching the transponders can be reduced, thereby reducing the restlessness of the viewer.

Furthermore, in the eighth example, unlike the seventh example in which the PATs of all of the physical channels are stored into the table storage section 106, only the PATs of the transport stream IDs of the physical channels set by the viewer are stored into the table storage section 106, so that the memory capacity of the table storage section 106 can be reduced as compared with the seventh example.

EXAMPLE 9

Next, a ninth example of the present invention will be described.

The fundamental configuration of the digital broadcast receiving apparatus in the ninth example is the same as that of the previous examples and is shown in FIG. 1.

In this ninth example, it is also assumed that a transponder number is assigned to the upper four bits of a program number and that the relationship between a transponder number and a transport stream ID and the relationship between a transport stream ID and a program number are defined as shown in Tables 1 and 2, respectively, in the same way as in the first example.

Figure 13:
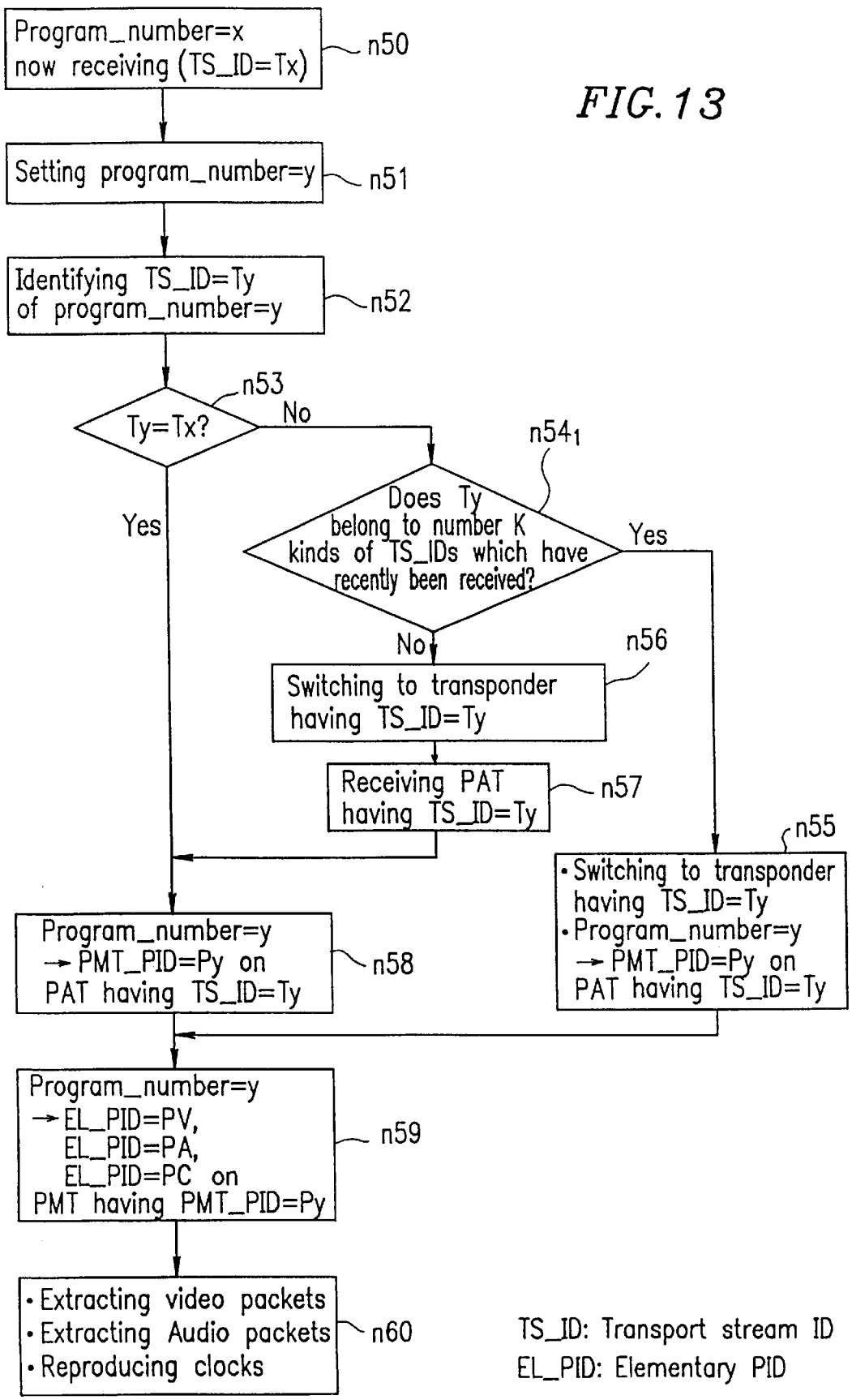
FIG. 13 is a flow chart for illustrating the operation according to a ninth example of the present invention.

Next, the processing executed in the case of changing the program numbers in the ninth example will be described with reference to the flow chart shown in FIG. 13.

In the eighth example, Step n54$_0$ or a step of determining whether or not the transport stream ID of the newly set program number in the case of changing the program numbers belongs to the transport stream IDs of the physical channels which have been set beforehand by the viewer in the receiving apparatus is provided. In the ninth example, Step n54$_0$ is replaced by Step n54$_1$ or a step of determining whether or not the transport stream ID of the newly set program number belongs to the transport stream IDs of number K (where K is a natural number equal to or smaller than N) kinds of different physical channels which have recently been used for receiving. The value of K may be set beforehand in the receiving apparatus or set by a viewer.

First, when a power is initially supplied to the receiving apparatus, the apparatus is set to receive a transport stream of a particular physical channel. From then on, every time physical channels are switched, the PAT of a new transport stream is sequentially stored into the table storage section 106, thereby storing the PATs (PAT_1, PAT_2, . . . PAT_K) of number K kinds of different transport stream IDs into the table storage section 106.

Steps n50 to n53 are the same as those of the eighth example. In changing the program numbers while switching the transponders (when Ty is different from Tx), if the transport stream ID of the newly set program number belongs to the number K kinds of different transport stream IDs which have recently been received, the control section 108 switches the transponder to the transponder having the transport stream ID=Ty and, in parallel with switching, extracts a PMT_PID corresponding to the program_ number y on the PAT having the transport stream ID=Ty stored in the table storage section 106 (at Step n55). On the other hand, if the transport stream ID of the newly set program number does not belong to the number K kinds of different transport stream IDs of the transponders or the physical channels which have recently been used for receiving, then the control section 108 switches the receiving transponders (at Step n56) and then receives a PAT having the transport stream ID=Ty (at Step n57) and newly stores the PAT in the table storage section 106 in place of the PAT which was stored least recently.

Then, a PMT_PID=Py corresponding to the program_ number y is extracted (at Step n58). The remaining processing is the same as that of the eighth example.

In the ninth example, Step $n54_0$ in the eighth example or a process step of determining whether or not the transport stream ID of the newly set program number is the same as the transport stream ID of any of the physical channels which have been set beforehand by the viewer in the receiving apparatus is replaced by Step $n54_1$ or a process step of determining whether or not the transport stream ID of the newly set program number belongs to the number K kinds of different transport stream IDs which have recently been received. If the transport ID of the newly set program number belongs to the number K kinds of different physical channel numbers or transport stream IDs which have recently been used for receiving, the extraction of a PMT_ PID on a PAT and the switching of the transponders are performed at the same time or in parallel with each other. As a result, the time required for switching the programs among the number K kinds of physical channels which have recently been used for receiving can be shortened as compared with a conventional example and a time difference between the time required for changing the programs while switching the transponders and a time required for changing the programs without switching the transponders can be reduced, thereby reducing the restlessness of the viewer.

Furthermore, in the ninth example, unlike the seventh example in which the PATs of all of the physical channels are stored into the table storage section 106, only the PATs of the number K kinds of physical channels or transport stream IDs which have recently been used for receiving are stored into the table storage section 106, so that the memory capacity of the table storage section 106 can be reduced as compared with the seventh example.

EXAMPLE 10

Next, a tenth example of the present invention will be described.

The fundamental configuration of the digital broadcast receiving apparatus in the tenth example is the same as that of the previous examples and is shown in FIG. 1.

In this tenth example, it is also assumed that a transponder number is assigned to the upper four bits of a program number and that the relationship between a transponder number and a transport stream ID and the relationship between a transport stream ID and a program number are defined as shown in Tables 1 and 2, respectively, in the same way as in the first example.

Figure 14:
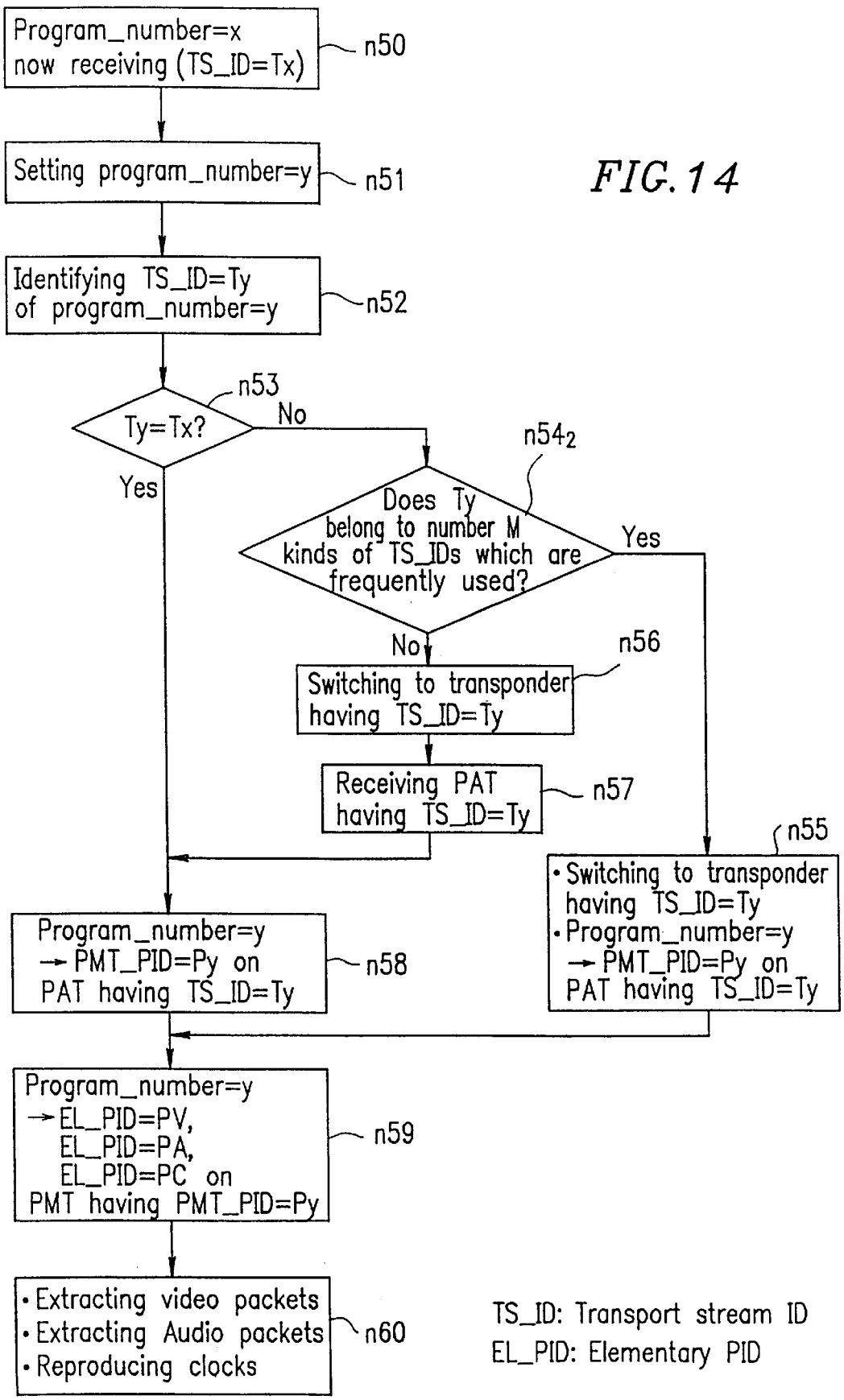
FIG. 14 is a flow chart for illustrating the operation according to a tenth example of the present invention.

Next, the processing executed in the case of changing the program numbers in the tenth example will be described with reference to the flow chart shown in FIG. 14.

In the eighth example, Step $n54_0$ or a step of determining whether or not the transport stream ID of the newly set program number in the case of changing the program numbers belongs to the transport stream IDs of the physical channels which have been set beforehand by the viewer in the receiving apparatus is provided. In the tenth example, Step $n54_0$ is replaced by Step $n54_2$ or a step of determining whether or not the transport stream ID of the newly set program number is included in the transport stream IDs of the physical channels which are frequently used by a viewer.

The transport stream IDs of the physical channels frequently used by a viewer are assumed to be number M (where M is a natural number equal to or smaller the total number N of the transponders) kinds of transport stream IDs which have been selected most frequently from number L (where L is also a natural number) kinds of transport stream IDs of the same number of transponders which have been set in changing the program numbers L times. For example, the values of L and M may be 20 and 5, respectively. However, the values of L and M may be set beforehand in the receiving apparatus or set by a viewer in the receiving apparatus. The PATs of the number M kinds of transport stream IDs belonging to the transport stream IDs of the physical channels which are frequently used by the viewer are determined by the control section 108 and then stored into the table storage section 106.

Steps n50 to n53 are the same as those in the eighth example. In changing the program numbers while switching the transponders (when Ty is different from Tx), if the transport stream ID of the newly set program number belongs to the number M kinds of transport stream IDs of the physical channels which are frequently used by the viewer, the control section 108 switches the transponders and, in parallel with switching, reads out a PAT having the transport stream ID=Ty of the program_number y from the table storage section 106, thereby extracting a PMT_PID corresponding to the program_number y (at Step n55).

On the other hand, if the transport stream ID of the newly set program number does not belong to the number M kinds of transport stream IDs of the transponders or the physical channels which are frequently used by the viewer, then the control section 108 switches the receiving transponders (at Step n56) and then receives a PAT having the transport stream ID=Ty and newly stores the PAT into the table storage section 106, thereby extracting a PMT_PID=Py corresponding to the program_number y (at Step n57). The remaining processing is the same as that of the ninth example.

In the tenth example, Step $n54_0$ of the eighth example or a process step of determining whether or not the transport stream ID of the newly set program number in the case of changing the program numbers is the same as the transport stream ID of any of the physical channels which have been set beforehand by the viewer in the receiving apparatus is replaced by Step $n54_2$ or a process step of determining whether or not the transport stream ID of the newly set program number belongs to the number M kinds of transport stream IDs of the transponders or the physical channels which are frequently used by the viewer. If the transport ID of the newly set program number belongs to the number M kinds of physical channel numbers or transport stream IDs which are frequently used by the viewer, the extraction of a PMT_PID on a PAT and the switching of the transponders are performed at the same time or in parallel with each other. As a result, the time required for changing the programs while switching the transponder to any of the transponders which are frequently used by the viewer can be shortened and a time difference between the time required for changing the programs while switching the transponders and a time required for changing the programs without switching the transponders can be reduced, thereby reducing the restlessness of the viewer.

In the seventh to the tenth examples, the table storage section 106 is assumed to be formed of a nonvolatile memory. Therefore, it is assumed that, even if the power supply is turned off, the contents of the PATs stored in the table storage section 106 are not erased.

In the first to the tenth examples, the upper four bits of a program number are assumed to be assigned to a physical channel number. Alternatively, the physical channel number may be assigned to J bits (where J is a natural number smaller than the bit width of the program number) or a part of the program number.

EXAMPLE 11

Next, an eleventh example of the present invention will be described.

The fundamental configuration of the digital broadcast receiving apparatus in the eleventh example is the same as that of the previous examples and is shown in FIG. 1.

Figure 15:
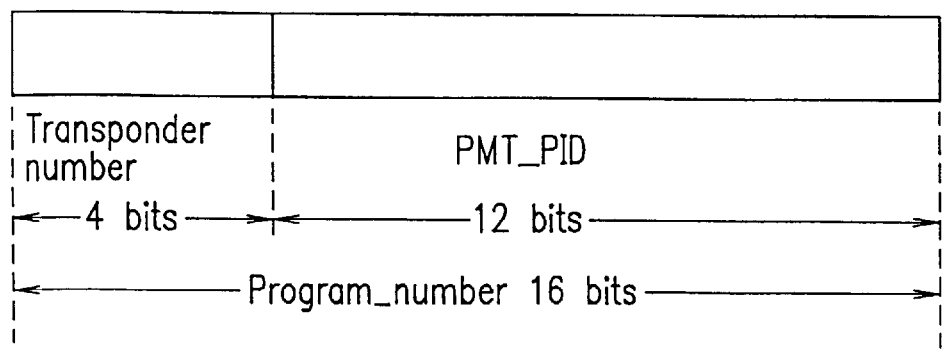
FIG. 15 is a diagram showing the assignment of a physical channel number and a program map table identifier to a program number according to an eleventh example of the present invention.

In this eleventh example, as shown in FIG. 15, it is assumed that a transponder number is represented by the upper four bits of a program number composed of 16 bits in the same way as in the first to the tenth examples and a PMT_PID is represented by the lower 12 bits of the program number. In this case, the PMT_PID is assumed to be temporally fixed. In other words, a PMT_PID corresponding to a program number is assumed to be temporally invariable.

Figure 16:
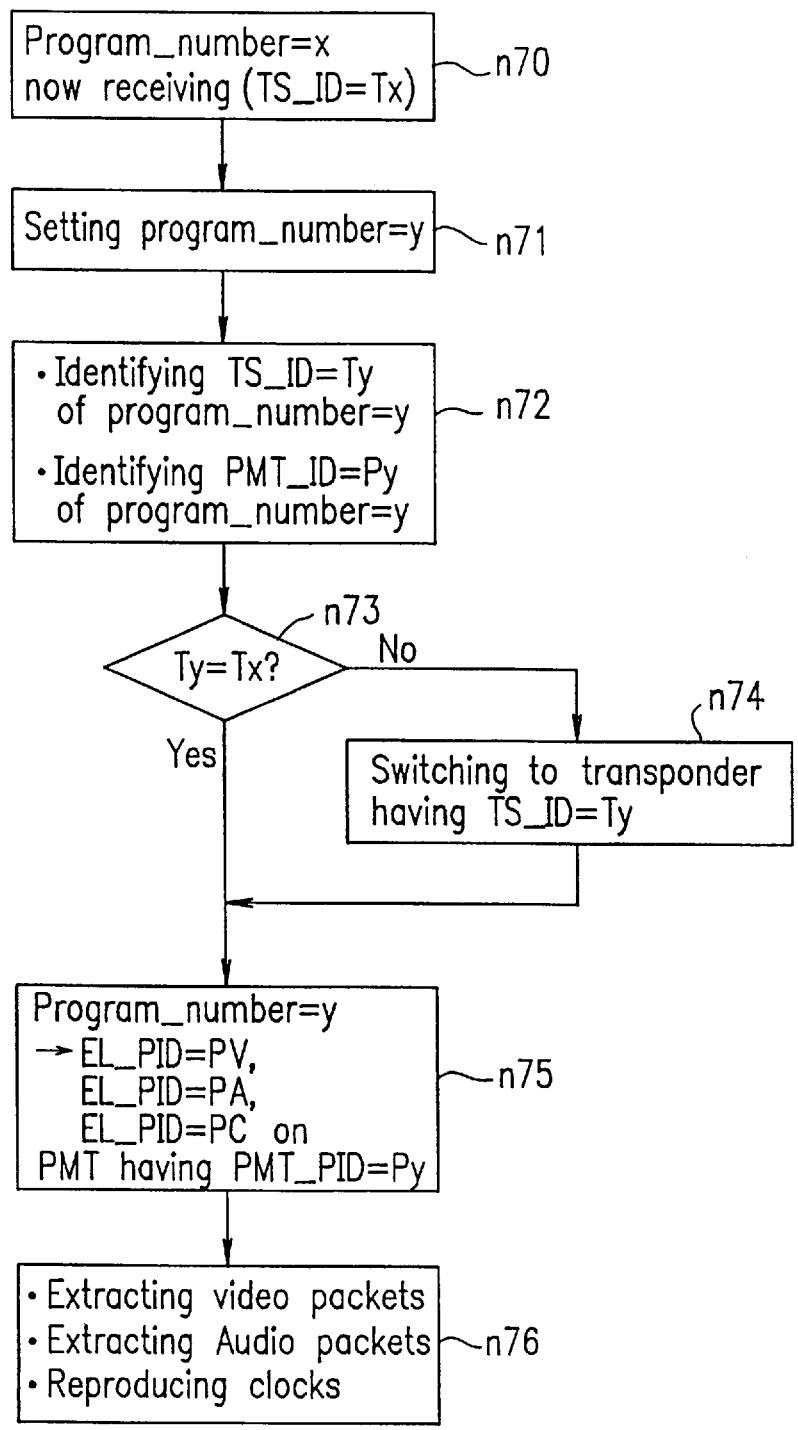
FIG. 16 is a flow chart for illustrating the operation according to the eleventh example of the present invention.

Next, the processing executed in the case of changing the program numbers in the eleventh example will be described with reference to the flow chart shown in FIG. 16.

In the eleventh example, when the program_number y is selected at the time of changing the program numbers (at Step n71), the transport stream ID and the PMT_PID of the program_number y are identified instantaneously (at Step n72). Then, it is determined whether or not the transport stream ID of the program_number y is the same as the transport stream ID of the program_number x or the number of the transponder which is now used for receiving (at Step n73). If the IDs are not the same, the receiving transponder switching section 102 is controlled, thereby switching the receiving transponders (at Step n74). In this stage, since the PMT_PID corresponding to the program_number y has already been identified at Step n72 in this eleventh example, it is no longer necessary to execute a step of extracting a PMT_PID on a PAT. The remaining processing after an elementary PIDs have been extracted is the same as that of the seventh example.

In the eleventh example, since a transponder number is assigned to the upper 4 bits of a program number composed of 16 bits and a PMT_PID are assigned to the lower 12 bits of the program number as shown in FIG. 15, it is no longer necessary to execute a step of extracting a PMT_PID from a PAT. Thus, the time required for changing the programs can be further shortened as compared with any of the seventh to the tenth examples. Moreover, since the PAT need not be stored in the table storage section 106 of the receiving apparatus, the memory capacity of the table storage section 106 can be reduced.

In the eleventh example, a physical channel number is assigned to the upper 4 bits of a program number composed of 16 bits and a PMT_PID is assigned to the lower 12 bits of the program number. Alternatively, a physical channel number may be assigned to P bits of a program number composed of 16 bits and a PMT_PID may be assigned to the remaining Q bits of the program number (where P and Q are natural numbers equal to or smaller than 16).

It is noted that the same effects can be attained if a transponder for a satellite broadcasting used in the first to the eleventh examples is replaced by a physical channel for a digital terrestrial broadcasting or a digital CATV broadcasting.

In addition, the relationship between a physical channel number (or a transponder number) and a transport stream ID and the relationship between a program number and a transport stream ID are not limited to those shown in Tables 1 and 2, respectively.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for switching programs in a digital broadcasting wherein, on a transmission side, a physical channel number for transmitting a program having a program number therethrough is assigned to a part of the program number,
and wherein, on a receiving side, in changing program numbers from a first program number to a second program number, the method comprises the steps of:
identifying a second physical channel number, for transmitting a second program having the second program number therethrough, based on the second program number;
determining whether or not the identified second physical channel number is the same as a first physical channel number which is now being received; and
if it is determined that the first and the second physical channel numbers are not the same, switching so as to receive the physical channel having the identified second physical channel number.

2. A method for switching programs in a digital broadcasting wherein, on a transmission side, a physical channel number for transmitting a program having a program number therethrough is assigned to a part of the program number,
and wherein, on a receiving side, in changing program numbers from a first program number to a second program number, the method comprises the steps of:
identifying a second physical channel number based on the second program number, for transmitting a second program having the second program number therethrough;
determining whether or not the identified second physical channel number is the same as a first physical channel number which is now being received;
switching so as to receive the physical channel having the identified second physical channel number, if it is determined that the first and the second physical channel numbers are not the same;
extracting a program map table packet identifier corresponding to the second program number from a program association table including the second program number;
extracting an elementary packet identifier corresponding to the second program number from a program map table including the extracted program map table packet identifier; and
extracting a packet having the extracted elementary packet identifier from a transport stream.

3. A method for switching programs in a digital broadcasting wherein, on a transmission side, a physical channel number for transmitting a program having a program number therethrough is assigned to a part of the program number and program association tables of all physical channels are transmitted as private data to transport streams of all of the physical channels, and wherein, on a receiving side, in changing program numbers from a first program number to a second program number, the method comprises the steps of:

identifying a second physical channel number based on the second program number, for transmitting a second program having the second program number therethrough;

determining whether or not the identified second physical channel number is the same as a first physical channel number which is now being received;

extracting a program map table packet identifier, corresponding to the second program number, from a program association table including the second program number, if it is determined that the first and the second physical channel numbers are the same;

switching so as to receive the physical channel having the identified second physical number and simultaneously extracting a program map table packet identifier, corresponding to the second program number, from one of the program association tables which have been transmitted as private data, if it is determined that the first and the second physical channel numbers are not the same;

extracting an elementary packet identifier, corresponding to the second program number, from a program map table including the extracted program map table packet identifier; and extracting a packet having the extracted elementary packet identifier from a transport stream.

4. A method for switching programs in a digital broadcasting wherein, on a transmission side, a physical channel number for transmitting a program having a program number therethrough is assigned to a part of the program number and program association tables of all physical channels are transmitted as private data to transport streams of all of the physical channels, and wherein, on a receiving side, in changing program numbers from a first program number to a second program number, the method comprises the steps of:

(a) identifying a second physical channel number based on the second program number for transmitting a second program having the second program number therethrough based on the second program number;

(b) determining whether or not the identified second physical channel number is the same as a first physical channel number which is now being received;

(c) determining whether or not the physical channel having the identified second physical channel number satisfies a predetermined condition if it is determined that the first and the second physical channel numbers are not the same;

(d) switching so as to receive the physical channel having the identified second physical channel number, if it is determined that the physical channel having the second physical channel number does not satisfy the predetermined condition;

(e) extracting a program map table packet identifier, corresponding to the second program number, from a program association table including the second program number;

(f) switching so as to receive the physical channel having the identified second physical channel number and simultaneously extracting a program map table packet identifier, corresponding to the second program number, from one of the program association tables which have been transmitted as private data, if it is determined that the physical channel having the second physical channel number satisfies the predetermined condition;

(g) extracting an elementary packet identifier, corresponding to the second program number, from a program map table including the extracted program map table packet identifier; and (h) extracting a packet having the extracted elementary packet identifier from a transport stream.

5. A method for switching programs in a digital broadcasting according to claim 4, wherein the predetermined condition is whether or not an absolute value representing a difference between the identified second physical channel number and the first physical channel number which is now being received is a predetermined value or less.

6. A method for switching programs in a digital broadcasting according to claim 4, wherein the predetermined condition is whether or not the identified second physical channel number is included in physical channel numbers which have been set beforehand.

7. A method for switching programs in a digital broadcasting according to claim 4, wherein the predetermined condition is whether or not the identified second physical channel number is included in a plurality of physical channel numbers which have ever been received.

8. A method for switching programs in a digital broadcasting according to claim 4, wherein the predetermined condition is whether or not the identified second physical channel number belongs to physical channel numbers which are frequently used by a viewer.

9. A method for switching programs in a digital broadcasting according to claim 8, wherein the physical channel numbers frequently used by the viewer are M kinds of physical channel numbers which have been selected most frequently from L kinds of physical channel numbers which have ever been selected in changing program numbers L times, where M and L are natural numbers and M is equal to or smaller than L.

10. A digital broadcast receiving apparatus for receiving a digital broadcast by transmitting a physical channel number for transmitting a program having a program number therethrough as a part of the program number, comprising:

identification means for identifying a second physical channel number based on the second program number for transmitting a second program having a newly set program number or a second program number therethrough;

determination means for determining whether or not the identified second physical channel number is the same as a first physical channel number which is now being received; and switching means for switching to receive the physical channel having the identified second physical channel number, if the determination means determines that the first and the second physical channel numbers are not the same.

11. A method for switching programs in a digital broadcasting wherein, on a transmission side, a physical channel number for transmitting a program having a program number therethrough is assigned to a part of the program number and a program map table packet identifier corresponding to the program number in a program association table is assumed to be a fixed value, and wherein, on a receiving side, program association tables of all physical channels are stored into storage means and, in changing program numbers from a first program number into a second program number, the method comprises the steps of:

identifying a second physical channel number based on the second program number for transmitting a second program having the second program number therethrough;

determining whether or not the identified second physical channel number is the same as a first physical channel number which is now being received;

extracting a program map table packet identifier, corresponding to the second program number, from one of the program association tables which is stored in the storage means and includes the second program number, if it is determined that the first and the second physical channel numbers are the same;

switching so as to receive the physical channel having the identified second physical channel number and simultaneously extracting a program map table packet identifier, corresponding to the second program number, from one of the program association tables which is stored in the storage means and includes the second program number, if it is determined that the first and the second physical channel numbers are not the same;

extracting an elementary packet identifier, corresponding to the second program number, from a program map table including the extracted program map table packet identifier; and extracting a packet having the extracted elementary packet identifier from a transport stream.

12. A method for switching programs in a digital broadcasting wherein, on a transmission side, a physical channel number for transmitting a program having a program number therethrough is assigned to a part of the program number and a program map table packet identifier corresponding to the program number in a program association table is assumed to be a fixed value, and wherein, on a receiving side, program association tables of physical channels satisfying a predetermined condition are stored in storage means and, in changing program numbers from a first program number to a second program number, the method comprises the steps of:

(a) identifying a second physical channel number based on the second program number for transmitting a second program having the second program number therethrough;

(b) determining whether or not the identified second physical channel number is the same as a first physical channel number which is now being received;

(c) determining whether or not the identified second physical channel number satisfies the predetermined condition if it is determined that the first and the second physical channel numbers are not the same;

(d) switching so as to receive the physical channel having the identified second physical channel number, if it is determined that the second physical channel number does not satisfy the predetermined condition;

(e) extracting a program map table packet identifier, corresponding to the second program number, from a program association table including the second program number after it has been determined that the first and the second physical channel numbers are the same in the step (b) or after the step (d) of switching for receiving the physical channel having the second physical channel number has been executed;

(f) switching so as to receive the physical channel having the identified second physical channel number and simultaneously extracting a program map table packet identifier, corresponding to the second program number, from one of the program association tables which have been stored in the storage means, if it is determined that the second physical channel number satisfies the predetermined condition in the step (c);

(g) extracting an elementary packet identifier, corresponding to the second program number, from a program map table including the extracted program map table packet identifier; and (h) extracting a packet having the extracted elementary packet identifier from a transport stream.

13. A method for switching programs in a digital broadcasting according to claim 12, wherein the predetermined condition is whether or not the identified second physical channel number is included in physical channel numbers which have been set beforehand.

14. A method for switching programs in a digital broadcasting according to claim 12, wherein the predetermined condition is whether or not the identified second physical channel number is included in a plurality of physical channels numbers which have ever been received.

15. A method for switching programs in a digital broadcasting according to claim 12, wherein the predetermined condition is whether or not the identified second physical channel number belongs to physical channel numbers which are frequently used by a viewer.

16. A method for switching programs in a digital broadcasting according to claim 15, wherein the physical channel numbers frequently used by the viewer are M kinds of physical channel numbers which have been selected most frequently from L kinds of physical channel numbers which have been selected in changing program numbers L times, where M and L are natural numbers and M is equal to or smaller than L.

17. A method for switching programs in a digital broadcasting wherein, on a transmission side, a physical channel number for transmitting a program having a program number therethrough is assigned to a part of the program number and a packet identifier for a program map table on which an identifier of a packet or a component of the program having the program number is described is assigned to the other part of the program number, and wherein, on a receiving side, in changing program numbers from a first program number to a second program number, the method comprises the steps of:

identifying a second physical channel number for transmitting a second program having the second program number therethrough and the packet identifier of the program map table based on the second program number;

determining whether or not the identified second physical channel number is the same as a first physical channel number which is now being received;

switching so as to receive the physical channel having the identified second physical channel number if it is determined that the first and the second physical channel numbers are not the same;

extracting an elementary packet identifier, corresponding to the second program number, from a program map table including the identified program map table packet identifier; and extracting a packet having the extracted elementary packet identifier from a transport stream.

18. A digital broadcast receiving apparatus for receiving a digital broadcast by transmitting a physical channel number for transmitting a program having the program number therethrough as a part of the program number and a packet identifier for a program map table on which a packet identifier of a component of the program having the program number is described as the other part, comprising:

identification means for identifying a second physical channel number for transmitting a second program and program map table packet identifier of the second program by a newly set program number of the second program;

determination means for determining whether or not the identified second physical channel number is the same as a first physical channel number which is now being received; and switching means for receiving the physical channel having the identified second physical channel number, if the determination means determines that the first and the second physical channel numbers are not the same.

* * * * *